(12) United States Patent
Ohtake

(10) Patent No.: US 6,249,389 B1
(45) Date of Patent: Jun. 19, 2001

(54) VARIABLE FOCAL-LENGTH LENS SYSTEM

(75) Inventor: Motoyuki Ohtake, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/271,595

(22) Filed: Mar. 17, 1999

(30) Foreign Application Priority Data

Mar. 25, 1998 (JP) ................................. 10-076380

(51) Int. Cl.$^7$ ................................................. G20B 15/14
(52) U.S. Cl. ......................... 359/684; 359/676; 359/683
(58) Field of Search ................................... 359/676, 683, 359/684, 686, 687, 739, 740

(56) References Cited

U.S. PATENT DOCUMENTS

| | | | |
|---|---|---|---|
| 4,978,204 | 12/1990 | Ito ........................................ | 350/423 |
| 5,666,229 | 9/1997 | Otaki .................................... | 359/683 |
| 5,668,667 | * 9/1997 | Ohtake ................................. | 359/683 |
| 5,696,632 | * 12/1997 | Ohtake ................................. | 359/684 |
| 5,828,499 | * 10/1998 | Ohtake ................................. | 359/676 |

FOREIGN PATENT DOCUMENTS

| | | | |
|---|---|---|---|
| 273211 | 3/1990 | (JP) .............................. | G02B/15/20 |
| 2207210 | 8/1990 | (JP) .............................. | G02B/15/20 |
| 6265788 | 9/1994 | (JP) .............................. | G02B/15/20 |
| 727979 | 1/1995 | (JP) .............................. | G02B/15/20 |

\* cited by examiner

Primary Examiner—Georgia Epps
Assistant Examiner—David N. Spector
(74) Attorney, Agent, or Firm—Vorys, Sater, Seymour and Pease LLP

(57) ABSTRACT

A variable-focus lens system that is small in size and permits attainment of high zooming ratio while maintaining high performance. In order from the object side, there are therein a first, positive lens group; a second, negative lens group; a third, positive lens group; a fourth, positive lens group; and a fifth, negative lens group; all of the lens groups move toward the object side in such fashion as to cause the distance between the first and second lens groups to increase, the distance between the second and third lens groups to decrease, the distance between the third and fourth lens groups to increase, and the distance between the fourth and the fifth lens groups to decrease, when the positional state of the lens changes from the extreme wide-angle state to the extreme telephoto state. At this time, the second lens group and the fourth lens group move in integral fashion during a change in the positional state of the lens, an aperture stop is arranged between the second and third lens groups, and the aforesaid third lens group moves during short-distance focusing. Suitable ranges for the widths of the second through fourth lens groups are defined by means of conditional expressions.

6 Claims, 22 Drawing Sheets

FNO = 3.72

1.000

Y = 17.20

1.000

Y = 17.20

5.000%

A = -36.62 y = 17.2

A = -32.48 y = 12.0

A = -27.73 y = 8.6

A = -20.55 y = 4.3

A = 0.0 y = 0.0

0.100

FIG. 4A  FIG. 4B  FIG. 4C
FNO = 7.58   Y = 17.20   Y = 17.20
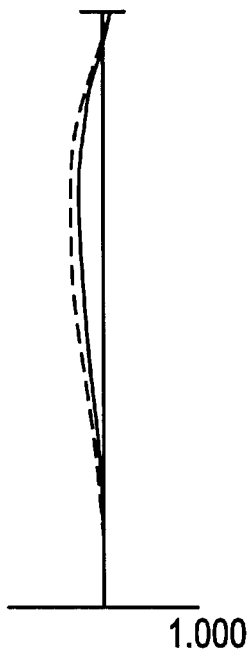
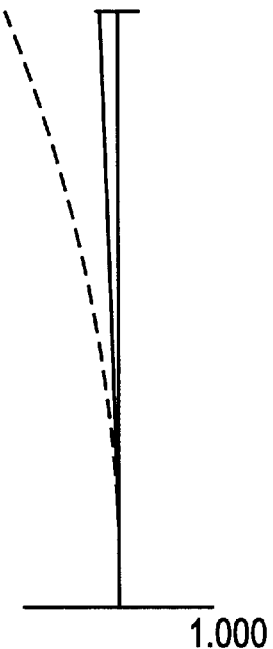
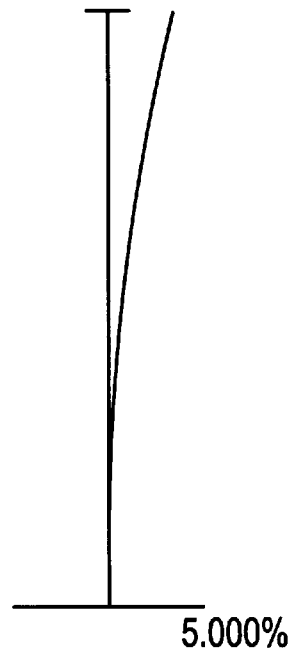
1.000   1.000   5.000%
FIG. 4D
A = −16.81, y = 17.2
FIG. 4E
A = −14.54, y = 12.0
FIG. 4F
A = −12.16, y = 8.6
FIG. 4G
A = −8.82, y = 4.3
FIG. 4H
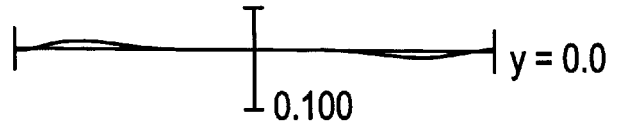
A = 0.0, y = 0.0
0.100

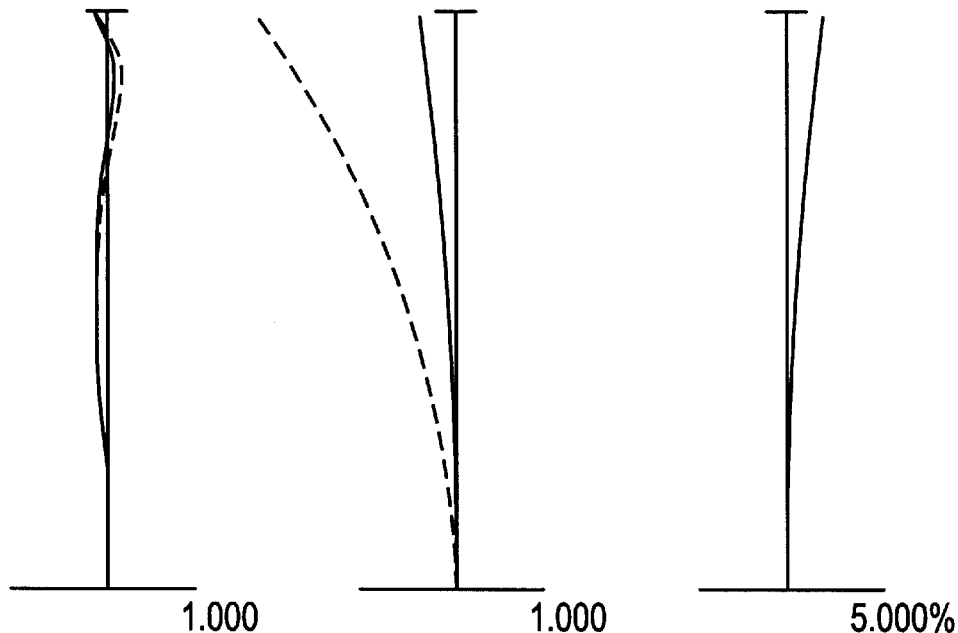

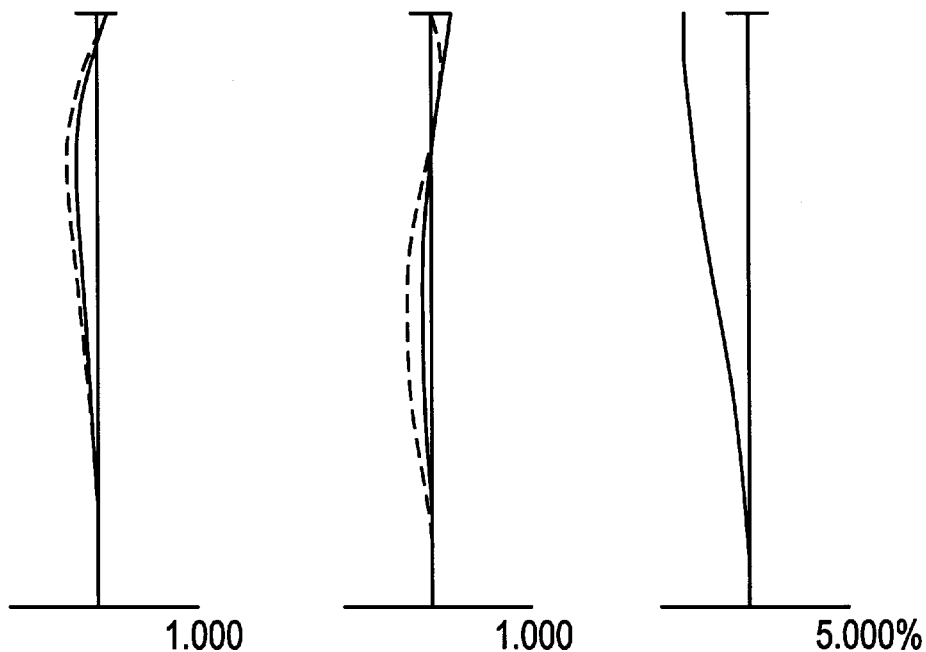
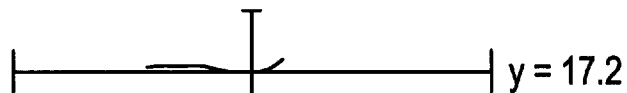
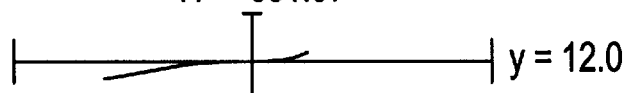
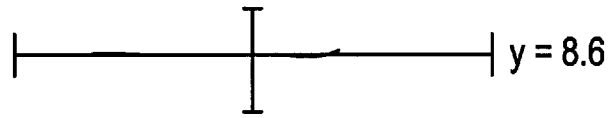
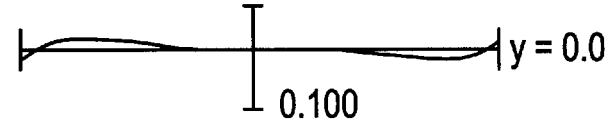

FIG. 7A  FIG. 7B  FIG. 7C
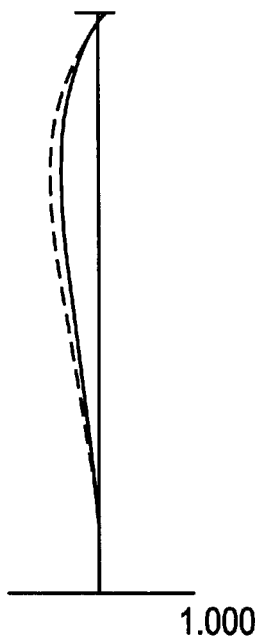
NA = 0.07
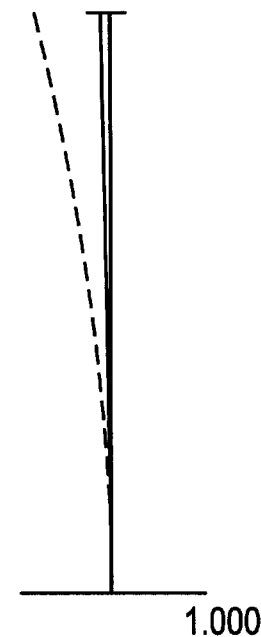
Y = 17.20
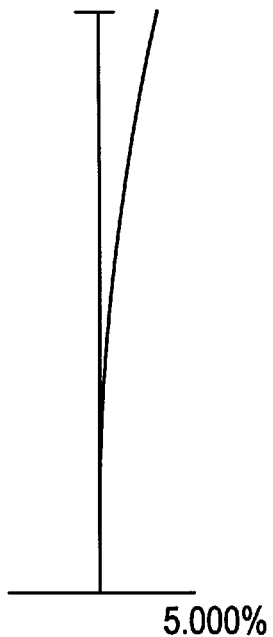
Y = 17.20
1.000   1.000   5.000%
FIG. 7D
H = -666.33, y = 17.2
FIG. 7E
H = -571.82, y = 12.0
FIG. 7F
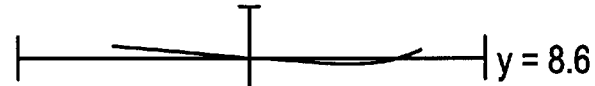
H = -474.50, y = 8.6
FIG. 7G
H = -341.47, y = 4.3
FIG. 7H
H = 0.0, y = 0.0
0.100

FIG. 8A
NA = 0.05
FIG. 8B
Y = 17.20
FIG. 8C
Y = 17.20
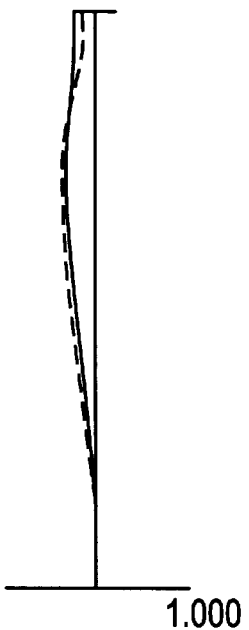
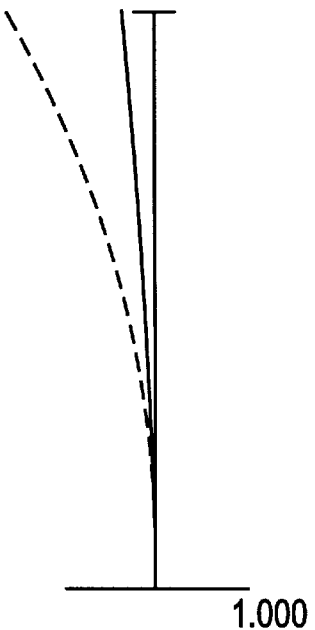
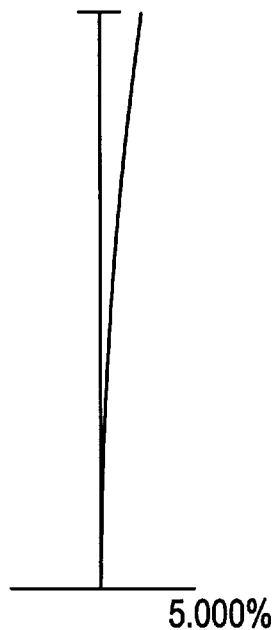
1.000          1.000          5.000%
FIG. 8D
H = -672.74
y = 17.2
FIG. 8E
H = -575.50
y = 12.0
FIG. 8F
H = -476.44
y = 8.6
FIG. 8G
H = -342.14
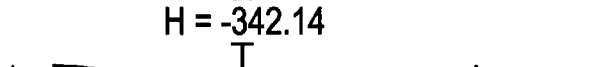
y = 4.3
FIG. 8H
H = 0.0
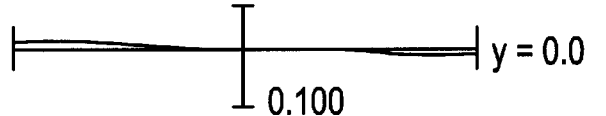
y = 0.0
0.100

FNO = 4.37   Y = 17.20   Y = 17.20

1.000   1.000   5.000%

A = -33.96, y = 17.2

A = -29.77, y = 12.0

A = -25.21, y = 8.6

A = -18.55, y = 4.3

A = 0.0, y = 0.0

0.100

FNO = 7.86

Y = 17.20

Y = 17.20

1.000   1.000   5.000%

A = -16.81, y = 17.2

A = -14.54, y = 12.0

A = -12.15, y = 8.6

A = -8.82, y = 4.3

A = 0.0, y = 0.0

0.100

FIG. 12A  FIG. 12B  FIG. 12C
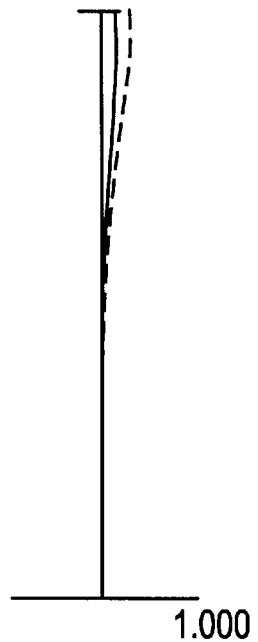
FNO = 12.04
1.000
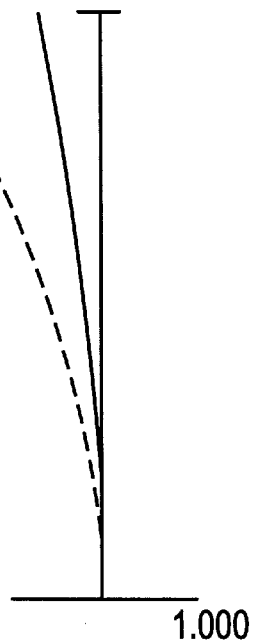
Y = 17.20
1.000
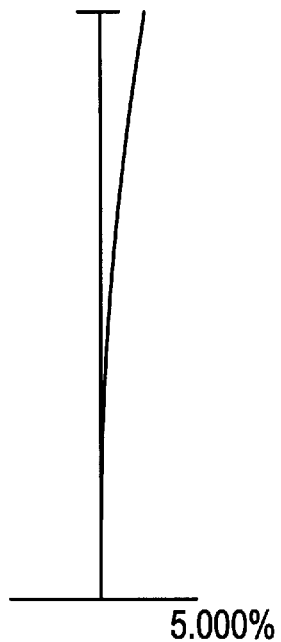
Y = 17.20
5.000%
FIG. 12D
A = -9.82, y = 17.2
FIG. 12E
A = -8.43, y = 12.0
FIG. 12F
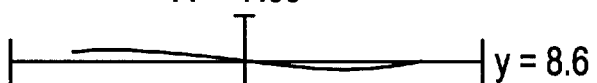
A = -7.00, y = 8.6
FIG. 12G
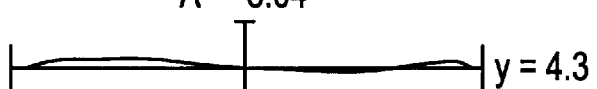
A = -5.04, y = 4.3
FIG. 12H
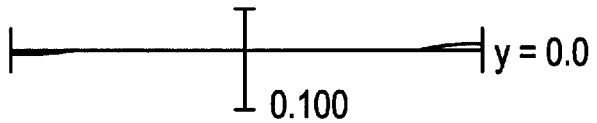
A = 0.0, y = 0.0
0.100

FIG. 13A  FIG. 13B  FIG. 13C
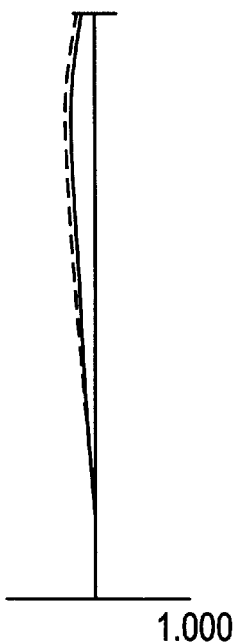
NA = 0.11
1.000
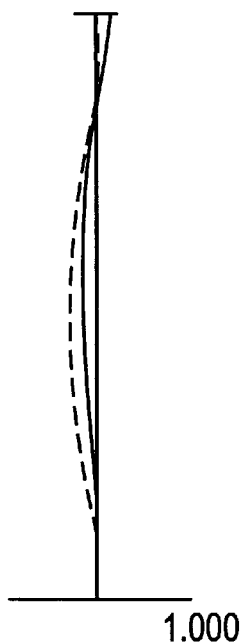
Y = 17.20
1.000
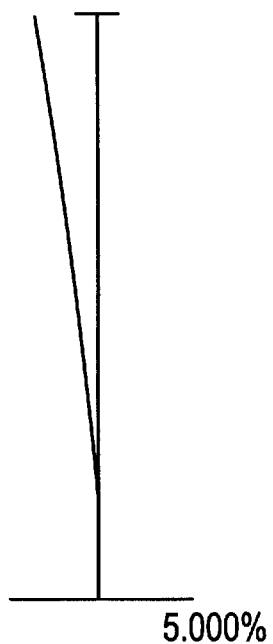
Y = 17.20
5.000%
FIG. 13D
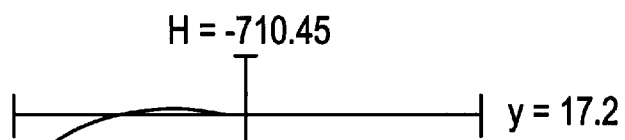
H = -710.45
y = 17.2
FIG. 13E
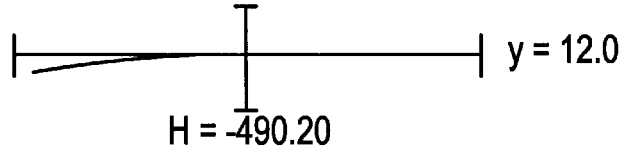
H = -599.15
y = 12.0
FIG. 13F
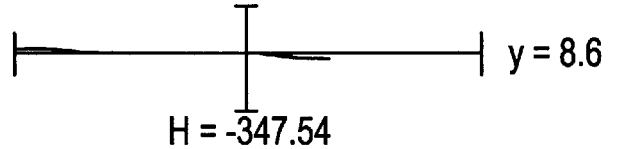
H = -490.20
y = 8.6
FIG. 13G
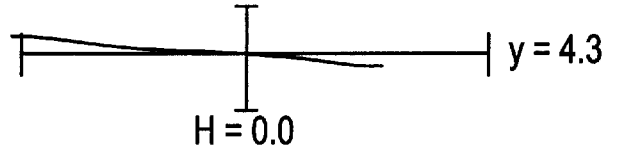
H = -347.54
y = 4.3
FIG. 13H
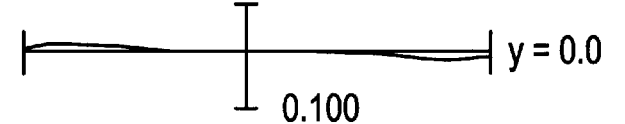
H = 0.0
y = 0.0
0.100

NA = 0.06   Y = 17.20   Y = 17.20

1.000   1.000   5.000%

H = -666.55, y = 17.2

H = -571.91, y = 12.0

H = -474.53, y = 8.6

H = -341.47, y = 4.3

H = 0.0, y = 0.0

0.100

NA = 0.04
1.000

Y = 17.20
1.000

Y = 17.20
5.000%

H = −672.36, y = 17.2

H = −575.23, y = 12.0

H = −476.27, y = 8.6

H = −342.06, y = 4.3

H = 0.0, y = 0.0
0.100

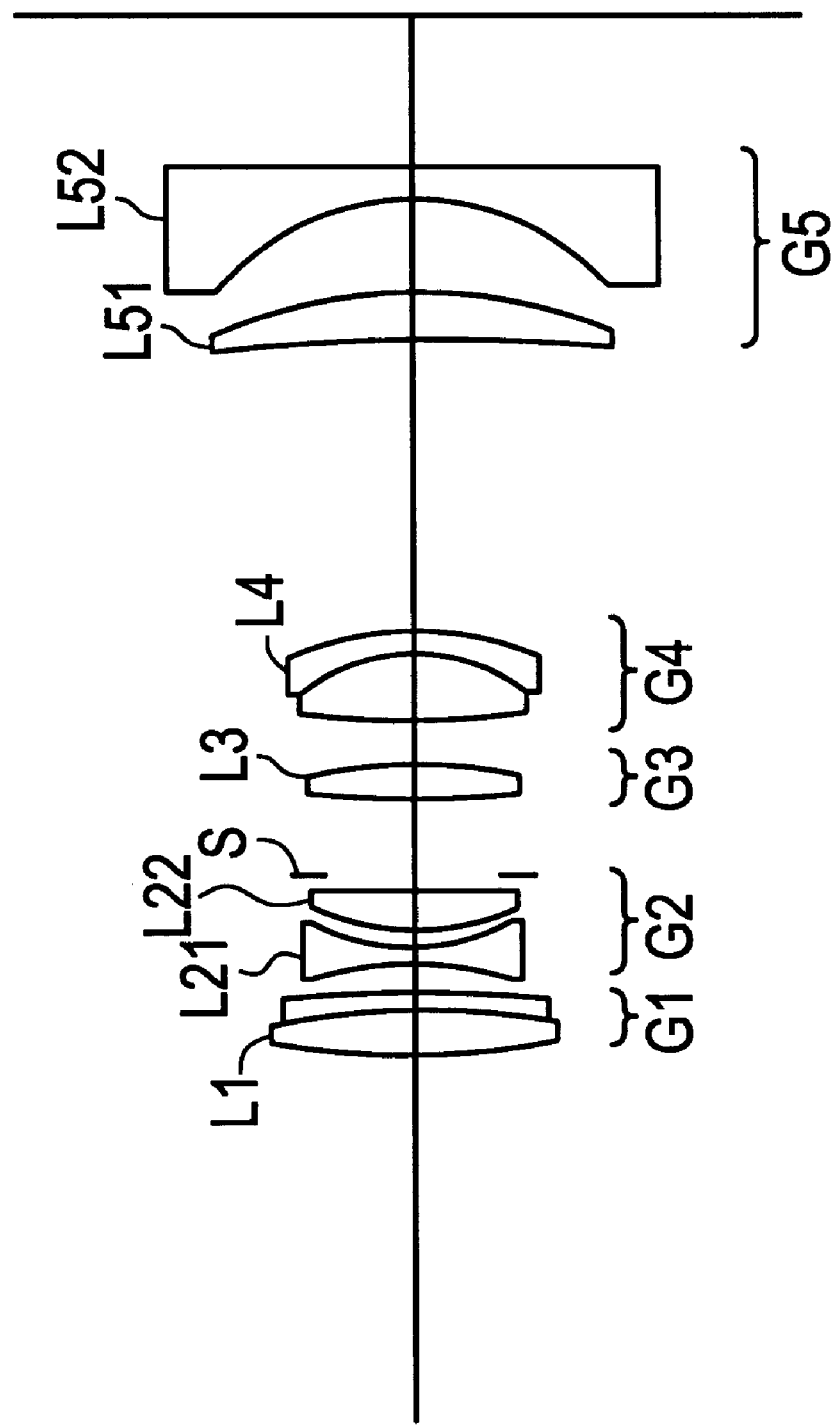

FNO = 4.09
1.000

Y = 17.20
1.000

Y = 17.20
5.000%

A = -34.01, y = 17.2

A = -29.89, y = 12.0

A = -25.32, y = 8.6

A = -18.62, y = 4.3

A = 0.0, y = 0.0
0.100

FNO = 7.32   Y = 17.20   Y = 17.20

1.000   1.000   5.000%

A = -16.81 y = 17.2

A = -14.54 y = 12.0

A = -12.16 y = 8.6

A = -8.82 y = 4.3

A = 0.0 y = 0.0

0.100

FIG. 19A   FIG. 19B   FIG. 19C
FNO = 10.99    Y = 17.20    Y = 17.20
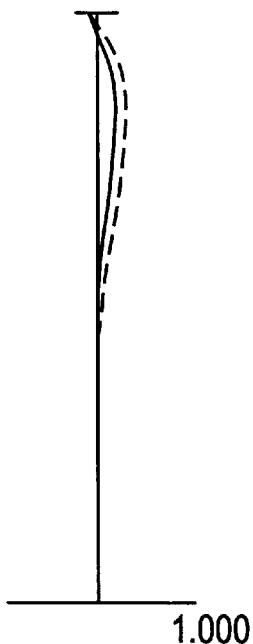   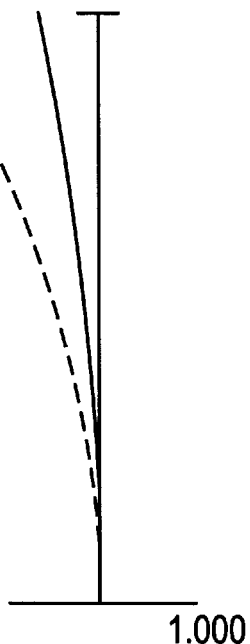   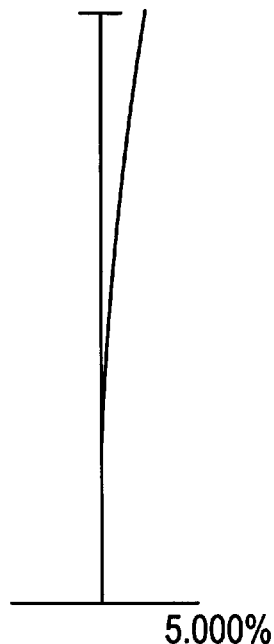
1.000    1.000    5.000%
FIG. 19D
A = -9.81        y = 17.2
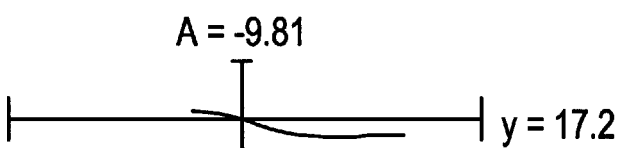
FIG. 19E
A = -8.42        y = 12.0
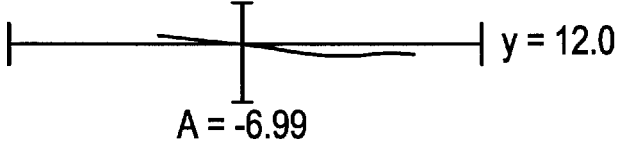
FIG. 19F
A = -6.99        y = 8.6
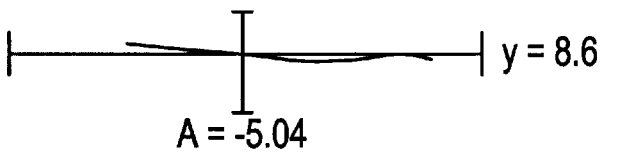
FIG. 19G
A = -5.04        y = 4.3
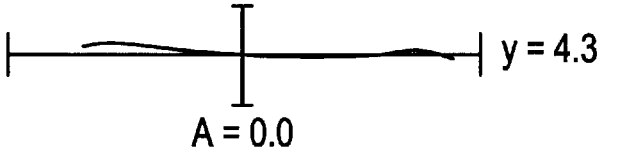
FIG. 19H
A = 0.0          y = 0.0
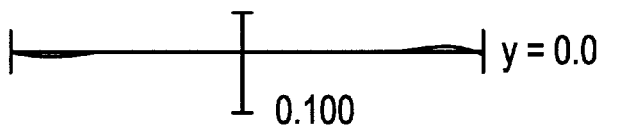
0.100

FIG. 20A   FIG. 20B   FIG. 20C
NA = 0.12   Y = 17.20   Y = 17.20
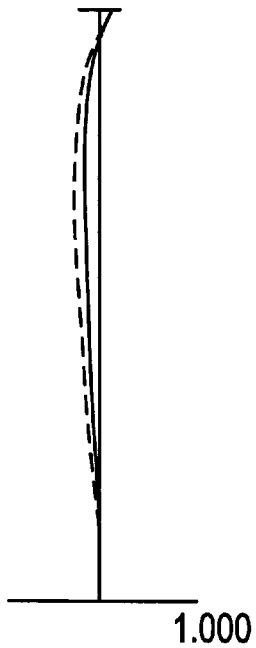   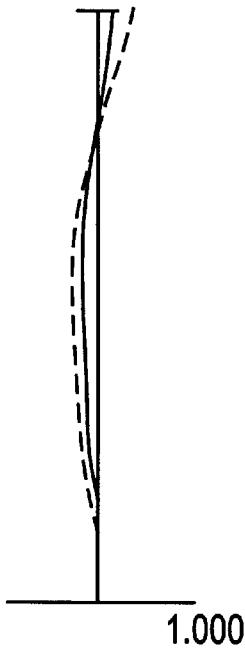   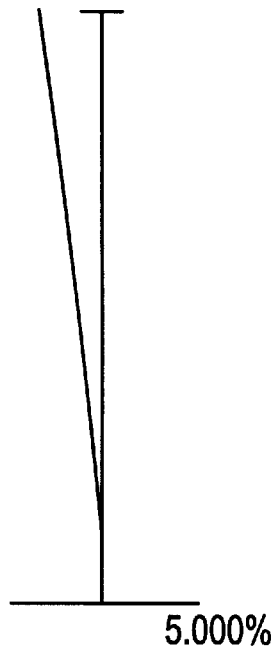
1.000   1.000   5.000%
FIG. 20D
H = -709.79, y = 17.2
FIG. 20E
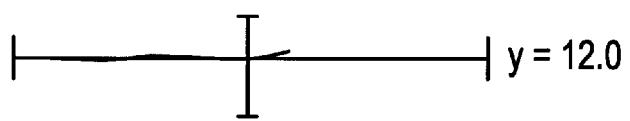
H = -600.51, y = 12.0
FIG. 20F
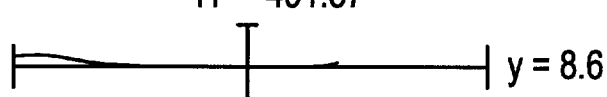
H = -491.57, y = 8.6
FIG. 20G
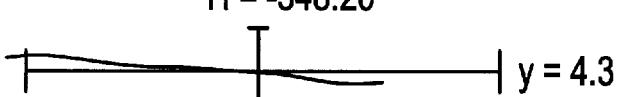
H = -348.20, y = 4.3
FIG. 20H
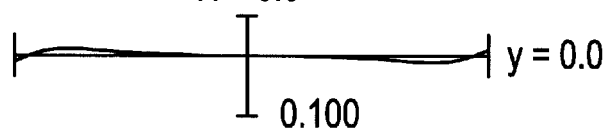
H = 0.0, y = 0.0
0.100

NA = 0.07    Y = 17.20    Y = 17.20

1.000    1.000    5.000%

H = -666.51 y = 17.2

H = -571.90 y = 12.0

H = -474.54 y = 8.6

H = -341.48 y = 4.3

H = 0.0 y = 0.0

0.100

NA = 0.05

1.000

Y = 17.20

1.000

Y = 17.20

5.000%

H = −671.66, y = 17.2

H = −574.81, y = 12.0

H = −476.04, y = 8.6

H = −341.98, y = 4.3

H = 0.0, y = 0.0, 0.100

VARIABLE FOCAL-LENGTH LENS SYSTEM

FIELD OF THE INVENTION

The present invention pertains to a variable-focal-length lens system, and in particular pertains to a variable-focal-length lens system that is small in size and that has a high zooming ratio.

BACKGROUND OF THE RELATED ART

In recent years, zoom lenses have come into common use in photographic optical systems for use in still cameras, video cameras, and the like; in particular, cameras employing so-called high-zoom lenses wherein zooming ratios are in excess of three are rapidly becoming standard equipment.

Particularly with integral-lens-type cameras, wherein the photographic optical system is integral with the camera main body, importance is placed on portability, and there have accordingly been a variety of proposals pertaining to zoom lenses suitable for applications permitting reduction in size and weight.

Specifically, positive-positive-negative three-group-type lenses (consisting of, in order from the object side, a positive lens group, a positive lens group, and a negative lens group) and positive-negative-positive-negative four-group-type lenses (consisting of, in order from the object side, a positive lens group, a negative lens group, a positive lens group, and a negative lens group) are known as variable-magnification optical systems that are small in size and that are suitable for high zooming ratio.

For example, Japanese Laid-Open Patent Application (Kokai) No. H2 [1990]-73211 and the like are known as examples of positive-positive-negative three-group-type lenses, while Japanese Laid-Open Patent Application (Kokai) No. H2[1990]-207210, Japanese Laid-Open Patent Application (Kokai) No. H6[1994]-265788, and the like are known as examples of positive-negative-positive-negative four-group-type lenses.

Furthermore, the positive-negative-positive-positive-negative five-group-type lens disclosed in Japanese Laid-Open Patent Application (Kokai) No. H7[1995]-27979 is known.

However, there has been the problem that an increase in zooming ratio is accompanied by an increase in focal length, causing the length of the overall lens to become large and adversely affecting portability.

Furthermore, with the positive-positive-negative three-group-type lens, due to the fact that above a zooming ratio of three the lateral magnification of the negative lens group becomes large when in the extreme telephoto state, it is necessary that the positional accuracy of the several lens groups be made extremely precise, with the result that lens performance deteriorates markedly because of the influence of stopping precision. In particular, because of the need to increase the lateral magnification of the negative lens group in order to achieve small size, it has been difficult to simultaneously achieve both small size and high performance.

With the positive-negative-positive-negative four-group-type lens, because of the increased number of movable lens groups the lateral magnification of the negative lens group arranged nearest to the image plane is relaxed i.e., is lessened when in the extreme telephoto state, and, while the zooming ratio might be high and it may be possible to achieve small size and high performance, it has not been possible to achieve adequate wide-angle performance.

While the positive-negative-positive-positive-negative five-group-type lens better permits attainment of high zooming ratio and small size while maintaining high performance as compared with the aforementioned four-group-type lens, because of the large widths of the several lens groups in the direction of the optical axis it has been difficult to achieve improved camera portability.

The object of the present invention is to solve the aforementioned problems and to provide a variable-focal-length lens system that is small in size and that is suitable for applications having a high zooming ratio while maintaining high performance.

SUMMARY OF THE INVENTION

In order to achieve the aforesaid object, the variable-focal-length lens system associated with the present invention possesses, in order from the object side thereof, a first lens group having positive refracting power, a second lens group having negative refracting power, a third lens group having positive refracting power, a fourth lens group having positive refracting power, and a fifth lens group having negative refracting power, an aperture stop being arranged between the aforesaid second lens group and the aforesaid third lens group; all of the lens groups move toward the object side in such fashion as to cause the distance between the aforesaid first lens group and the aforesaid second lens group to increase, the distance between the aforesaid second lens group and the aforesaid third lens group to decrease, the distance between the aforesaid third lens group and the aforesaid fourth lens group to increase, and the distance between the aforesaid fourth lens group and the aforesaid fifth lens group to decrease, when the positional state of the lens changes from the extreme wide-angle state to the extreme telephoto state; the aforesaid second lens group and the aforesaid fourth lens group move in integral fashion during a change in the positional state of the lens; the aforesaid third lens group moves during short-distance focusing; and the following conditional expression (1) is satisfied:

$$0.05 < Dc/\{Z \cdot (ft \cdot fw)^{1/2}\} < 0.1, \quad (1)$$

where:
- Dc=Length along the optical axis from the lens surface at the object-most side of the second lens group to the lens surface at the image-most side of the fourth lens group,
- fw=Focal length when in the extreme wide-angle state,
- ft=Focal length when in the extreme telephoto state, and
- Z=Zooming ratio (=ft/fw).

BRIEF DESCRIPTION OF THE DRAWINGS

FIGS. 4A–4H (collectively referred to as "FIG. 4") contain aberration curves for the first embodiment when in an intermediate focal-length state (and focused on a subject at an infinite distance).

FIGS. 5A–5H (collectively referred to as "FIG. 5") contain aberration curves for the first embodiment when in the extreme telephoto state (and focused on a subject at an infinite distance).

FIGS. 6A–6H (collectively referred to as "FIG. 6") contain aberration curves for the first embodiment when in the extreme wide-angle state (and focused on a subject at a short distance).

FIGS. 7A–7H (collectively referred to as "FIG. 7") contain aberration curves for the first embodiment when in an intermediate focal-length state (and focused on a subject at a short distance).

FIGS. 8A–8H (collectively referred to as "FIG. 8") contain aberration curves for the first embodiment when in the extreme telephoto state (and focused on a subject at a short distance).

FIGS. 12A–12H (collectively referred to as "FIG. 12") contain aberration curves for the second embodiment when in the extreme telephoto state (and focused on a subject at an infinite distance).

FIGS. 13A–13H (collectively referred to as "FIG. 13") contain aberration curves for the second embodiment when in the extreme wide-angle state (and focused on a subject at a short distance).

FIG. 16 is a cross-sectional diagram showing the constitution of a zoom lens in accordance with a third embodiment of the present invention.

FIGS. 19A–19H (collectively referred to as "FIG. 19") contain aberration curves for the third embodiment when in the extreme telephoto state (and focused on a subject at an infinite distance).

FIGS. 20A–20H (collectively referred to as "FIG. 20") contain aberration curves for the third embodiment when in the extreme wide-angle state (and focused on a subject at a short distance).

DETAILED DESCRIPTION OF PREFERRED EMBODIMENTS

Figure 1:
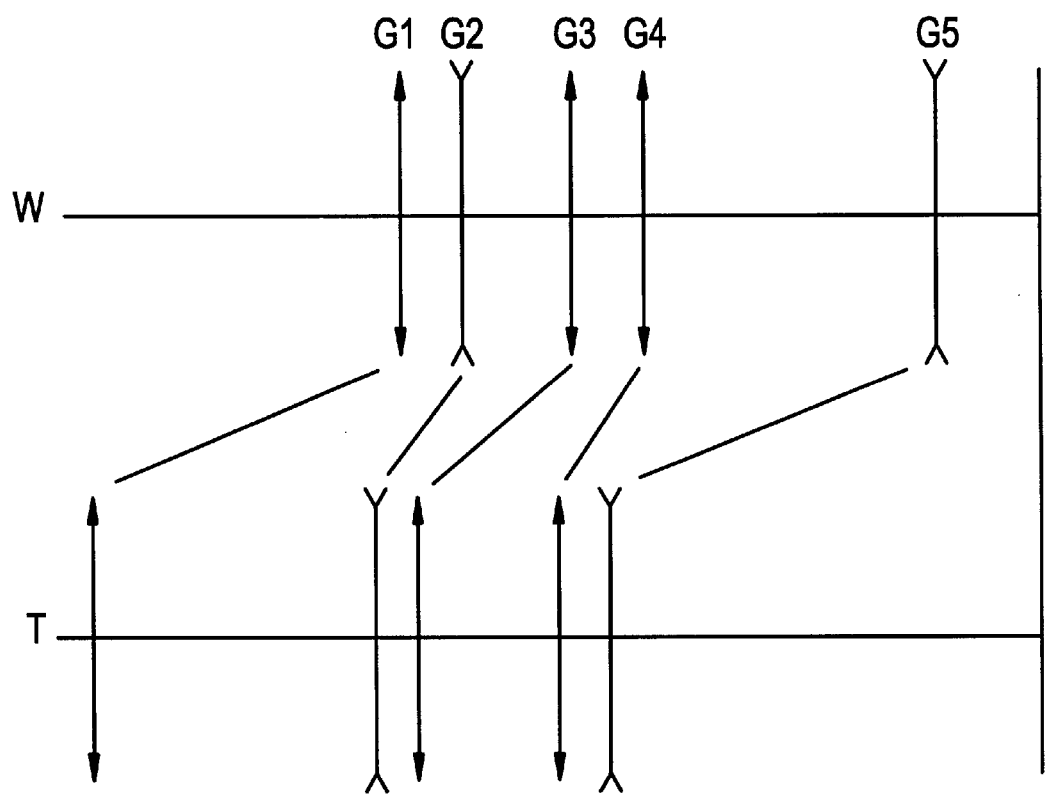
FIG. 1 is a drawing showing refracting power distribution in a zoom lens in accordance with the present invention.

The variable-focal-length lens system of the present invention, as shown for example in FIG. 1, is fundamentally constituted such that it possesses, in order from the object side thereof, a first lens group having positive refracting power, a second lens group having negative refracting power, a third lens group having positive refracting power, a fourth lens group having positive refracting power, and a fifth lens group having negative refracting power, and such that all of the lens groups move toward the object side in such fashion as to cause the distance between the first lens group and the second lens group to increase, the distance between the second lens group and the third lens group to decrease, the distance between the third lens group and the fourth lens group to increase, and the distance between the fourth lens group and the fifth lens group to decrease, when the positional state of the lens changes from the extreme wide-angle state to the extreme telephoto state.

In this constitution, an aperture stop is arranged between the second lens group and the third lens group. First, we will describe aperture stop arrangement.

To achieve a prescribed level of optical performance irrespective of the positional state of the lens while at the same time allowing for a high zooming ratio, it is necessary to respectively correct for fluctuations in axial aberrations and off-axial aberrations occurring as the positional state of the lens changes. Fluctuations in axial aberrations can be achieved (i.e., controlled) as a result of satisfactory correction of the axial aberrations produced by the several lens groups, but arrangement of an aperture stop is critical to correction of fluctuations in off-axial aberration.

Generally speaking, production of off-axial aberration is likely at lens groups which are far removed from an aperture stop because of the fact that off-axial light beams pass therethrough removed some distance from the optical axis; and conversely, such lens groups possess the characteristic that proper correction of off-axial aberrations thereat can be accomplished by giving the aperture stop the proper shape.

During a change in the positional state of the lens, when the heights at which off-axial light beams pass through the several lens groups vary widely, fluctuations in off-axial aberrations occurring as the positional state of the lens changes can be satisfactorily corrected in this way.

In particular, lens groups arranged to the image side of an aperture stop lend themselves to correction of coma occurring due to upper light beams (off-axial light beams arriving thereat above the optical axis and passing therethrough above the principal ray), while lens groups arranged to the object side of an aperture stop lend themselves to correction of coma occurring due to lower light beams (off-axial light beams arriving thereat above the optical axis and passing therethrough below the principal ray).

Accordingly, by arranging at least one or more lens groups to either side of an aperture stop and causing the plurality of lens groups to move such that the distances between them and the aperture stop vary widely when the positional state of the lens changes, it is possible to satisfactorily correct for fluctuations in off-axial aberrations occurring in conjunction with changes in the positional state of the lens.

In the present invention, then, high zooming ratio and high performance are simultaneously achieved as a result of respectively arranging at least one or more lens groups to both sides of an aperture stop; i.e., as a result of arranging the aperture stop in the vicinity of the center of the optical system.

In particular, in the present invention, it is desirable that an aperture stop be arranged between the second lens group and the third lens group, and that this aperture stop be made to move in integral fashion with the second lens group during a change in the positional state of the lens.

This is because the second lens group, with its negative refracting power, displays a strong diverging action, and so arranging the aperture stop at a location far removed from the second lens group would result in inability to satisfactorily correct for off-axial aberration produced at the second lens group when in the extreme wide-angle state, and moreover, arranging the aperture stop to the object side of the second lens group would result in inability to satisfactorily correct for off-axial aberration produced at the third lens group and fourth lens group due to the fact that off-axial light beams made to diverge at the second lens group would then pass through the third lens group and fourth lens group at points far removed from the optical axis.

Integral-lens-type cameras generally employ lens barrel constructions wherein a plurality of lens barrels are nested one inside another in telescopic fashion, the lens barrels being made to retract so as to assume a compact form when the camera is to be carried.

Accordingly, for improvement of portability of the camera main body it will be important to shorten the overall length of the lens when in the extreme telephoto state and to reduce lens thickness and lens diameter at each of the several lens groups.

While shortening of the overall length of the lens can easily be accomplished by strengthening the refracting powers of the several lens groups, if a prescribed range of focal lengths is to be maintained there will be a sharp increase in the required stopping precision of the lens, especially when in the extreme telephoto state, causing increased complexity in lens barrel construction and consequently impairing portability.

In the present invention, the length of the overall lens is shortened and stopping precisions of the lenses of the several lens groups are relaxed as a result of shortening the focal length of the extreme telephoto state while yet maintaining a prescribed zooming ratio, which is to say that the range of focal lengths is shifted toward shorter focal lengths.

Furthermore, because shortening of focal length causes off-axial light beams passing through the first lens group or the fifth lens group to become too far removed from the optical axis, thus leading to an increase in lens diameter, it is preferable in the present invention that the number of lenses in the several lens groups be reduced, that the lens diameters at the several lens groups be made small, and that lens thicknesses also be made small.

In the present invention, functions affecting correction of aberration at the several lens groups are separated in order to achieve a high zooming ratio with a small number of lenses.

We will now describe the functions of the several lens groups that make up the lens system of the present invention.

In the present invention, the fifth lens group, which is arranged at the image-most side., has negative refracting power and has a telephoto-type distribution of refracting power, so as to reduce the overall length of the lens. This permits improvement of portability.

Furthermore, by shortening the back-focus distance when in the extreme wide-angle state, off-axial light beams passing through the fifth lens group are removed some distance from the optical axis, and fluctuations in off-axial aberrations occurring as a result of changes in field angle at the fifth lens group are satisfactorily corrected. Causing the fifth lens group to move toward the object side during a change in the positional state of the lens from the extreme wide-angle state to the extreme telephoto state causes off-axial light beams passing through the fifth lens group to approach the optical axis, and off-axial aberrations occurring as a result of changes in the positional state of the lens are satisfactorily corrected.

However, overshortening of the back-focus distance when in the extreme wide-angle state will cause off-axial light beams passing through the fifth lens group to become too far removed from the optical axis, leading to excessive lens diameter, so it is desirable that a suitable value be used therefor.

In the present invention, to satisfactorily correct for positive distortion, production of which is likely when in the extreme wide-angle state, it is preferable that the combined refracting powers of the first lens group and the second lens group be made negative.

In particular, because of the large angle of incidence (the angle formed by an off-axial light beam and the optical axis) with which off-axial light beams are incident when in the extreme wide-angle state, satisfactory correction of off-axial aberration produced at the first lens group is achieved by arranging the first lens group and the second lens group in close proximity to each other.

Furthermore, by positioning the first lens group such that it is more toward the image side when in the extreme wide-angle state than when in the extreme telephoto state, off-axial light beams passing through the first lens group are made to approach the optical axis when in the extreme wide-angle state and occurrence of coma at marginal regions of the image plane is satisfactorily corrected. Widening the space between the first lens group and second lens group when in the extreme telephoto state causes strengthening of the converging action of the first lens group and allows shortening of overall lens length.

In the present invention, the lens groups from the second lens group to the fourth lens group, which are arranged in the vicinity of the aperture stop, primarily carry out correction of axial aberrations. In particular, to ensure an adequate back-focus distance when in the extreme wide-angle state, the second lens group has a strongly negative refracting power, and off-axial aberrations are likely to be produced as a result. For this reason, the aperture stop is arranged nearby so as to prevent off-axial light beams that pass through the second lens group from becoming too far removed from the optical axis.

By arranging the third lens group and the fourth lens group, which possess positive refracting power, to the image side of the aperture stop, off-axial light beams passing through the fifth lens group are made to approach the optical axis, permitting lens diameter to be made small. In particular, fluctuations in off-axial aberrations occurring as a result of changes in the positional state of the lens are satisfactorily corrected by arranging the third lens group and the fourth lens group such that they are adjacent to one another so as to obtain strong positive refracting power when in the extreme wide-angle state, and causing the distance between the third lens group and the fourth lens group to increase when in the extreme telephoto state.

Now, with zoom lenses it is common to carry out short-distance focusing by moving a single lens group, the method according to which this is performed falling into one of the following three categories:
(A) FF (front-group focusing) method,
(B) IF (inner focusing) method, and
(C) RF (rear focusing) method.

With the (A) FF method, because the amount of first lens group travel necessary to focus on a prescribed photographic subject is nearly constant regardless of the positional state of the lens, this method has been suitable for manual focusing.

As the autofocus function has become increasingly common in recent years, there have been attempts to improve the speed of the autofocus function. To achieve high-speed autofocus function it is essential that the mechanical work (=weight×travel) performed by the focusing group(s) be made small, but in the case of the (A) FF method, lens diameter is extremely large, making it unsuitable for autofocus applications.

The (B) IF method and the (C) RF method, because they permit lens group(s) having small lens diameters to be selected as focusing group(s), are suitable for applications having high-speed autofocus function, and it is desirable in the present invention to employ either the IF method or the RF method, both of which are appropriate for autofocus function.

In particular, it is desirable in the present invention to use the third lens group as the focusing group. As mentioned above, in the present invention, off-axial light beams passing through the second lens group and the third lens group pass therethrough at locations close to the optical axis.

Accordingly, there will be little change in the state of correction of off-axial aberration despite movement of the second lens group or the third lens group in the direction of the optical axis, and when either or both of these is made the focusing group(s) there will be little fluctuation in off-axial aberrations produced during short-distance focusing, and such a configuration lends itself to high performance.

In particular, in the present invention, because off-axial aberrations are likely to be produced at the second lens group and moving the second lens group would cause large fluctuations in off-axial aberrations during short-distance focusing, it is preferable that the third lens group be made to move during short-distance focusing.

Because increase in the number of movable lens groups in a multiple-group zoom lens leads to increased complexity in lens barrel structure, simplification of lens barrel structure is achieved in the present invention as a result of causing the second lens group and the fourth lens group to move in integral fashion during a change in the positional state of the lens and causing the third lens group to move during focusing.

Below, we describe the several conditional expressions.

If the second lens group and the fourth lens group are made to move in integral fashion, then causing a change in the distance between the second lens group and the fourth lens group during retraction of the lens barrels within the camera main body when the camera is to be carried would invite complexity in lens barrel structure and would tend to nullify the effect of causing the second lens group and the fourth lens group to move in integral fashion.

Exceeding the upper limit of conditional expression (1), and causing the width from the second lens group to the fourth lens group to become large, will cause the thickness of the camera main body when carried to become large, impairing portability. Conversely, below the lower limit of conditional expression (1), variation in the lateral magnification of the fifth lens group during changes in the positional state of the lens will become too large, preventing satisfactory correction of fluctuations in off-axial aberrations accompanying changes in the positional state of the lens.

Now, it is common to employ a lens barrel mechanism which is separately equipped with a zooming drive mechanism that changes the positional state of movable lens group lenses during zooming, and a focusing drive mechanism that drives a focusing group(s) during short-distance focusing. In the present invention, because, as described above, the second lens group and the fourth lens group are made to move in integral fashion, and the focusing group (the third lens group) is located between these two lens groups, it is preferred that a lens chamber that retains the second lens group be attached to the object side of the focusing drive mechanism, and a lens chamber that retains the fourth lens group be attached to the image side thereof, and this focusing drive mechanism and both of these lens chambers be made to move in integral fashion in the direction of the optical axis by means of a single zooming mechanism, and that the third lens group be made to move in the direction of the optical axis, not only during focusing but also at the time when the positional state of the lens is changed during zooming, by means of the focusing drive mechanism. Such a configuration has the advantage that it permits the lens barrels to be constituted without inviting complexity in the drive mechanisms.

Furthermore, to achieve small size and high performance it is desirable in the present invention that at least one of the following conditional expressions (2) and (3) be satisfied:

$$0.4 < Da/|f2| < 0.8, \quad (2)$$

and $$0.4 < f4/f1 < 0.7, \quad (3)$$

where:
  Da=Distance along the optical axis from the lens surface at the object-most side of the second lens group to the aperture stop when in the extreme wide-angle state,
  f2=Focal length of the second lens group (f2<0),
  f1=Focal length of the first lens group (f1>0), and
  f4=Focal length of the fourth lens group (f4>0).

Conditional expression (2) defines the relationship between the dimensions of the second lens group and the refracting power thereof, this conditional expression being for the purpose of ensuring balance between the amount of off-axial aberration produced when in the extreme wide-angle state and reduction in lens diameter at the fifth lens group.

Above the upper limit of conditional expression (2), coma occurring due to lower light beams when in the extreme wide-angle state cannot be satisfactorily corrected. Conversely, below the lower limit thereof, off-axial light beams passing through the fifth lens group will become too far removed from the optical axis when in the extreme wide-angle state, leading to increased lens diameter.

Conditional expression (3) defines the ratio between the focal lengths of the first lens group and the fourth lens group.

Above the upper limit of conditional expression (3), portability is impaired because of increased overall lens length when in the extreme telephoto state.

Conversely, below the lower limit thereof, off-axial light beams passing through the first lens group will become too far removed from the optical axis when in the extreme telephoto state, leading to increased lens diameter.

To attain more satisfactory imaging performance when in the extreme wide-angle state, it is desirable in the present invention that the following conditional expression (4) be satisfied:

$$0.8 < Db/|f5| < 2.4, \quad (4)$$

where:
Db=Distance from the aperture stop to the image plane when in the extreme wide-angle state, and
f5=Focal length of the fifth lens group (f5<0).

Above the upper limit of conditional expression (4), positive distortion produced at the fifth lens group becomes extremely large, and satisfactory correction of positive distortion becomes impossible. Conversely, below the lower limit thereof, adequate back-focus distance when in the extreme wide-angle state cannot be ensured.

To satisfactorily correct short-distance fluctuations produced during short-distance focusing, it is desirable in the present invention that the following conditional expression (5) be satisfied:

$$0.2 < f3/(ft \cdot fw)^{1/2} < 0.4, \quad (5)$$

where:
f3=Focal length of the third lens group,
fw=Focal length when in the extreme wide-angle state, and
ft=Focal length when in the extreme telephoto state.

Above the upper limit of conditional expression (5), travel of the third lens group during short-distance focusing becomes extremely large, leading to increased complexity in the focusing drive mechanism. Conversely, below the lower limit thereof, fluctuation in axial aberrations produced during short-distance focusing becomes extremely large.

To simplify the drive mechanism that drives the third lens group during focusing and to facilitate control thereof, it is desirable that the following conditional expression (6) be satisfied:

$$0.12 < (\beta 3t/\beta 3w)/Z < 0.3, \quad (6)$$

where:
β3t=Lateral magnification of the third lens group when in the extreme telephoto state,
β3w=Lateral magnification of the third lens group when in the extreme wide-angle state,
Z=Zooming ratio (=ft/fw),
fw=Focal length when in the extreme wide-angle state, and
ft=Focal length when in the extreme telephoto state.

When the third lens group is made to move during short-distance focusing, the travel thereof will vary depending on the positional state of the lens due to the variation in the combined focal length of the first lens group and the second lens group.

The precision with which the position of the third lens group must be controlled to attain a prescribed level of optical performance can be determined based on the ratio between the travel of the third lens group and the amount of the movement of the image plane produced as a result of that travel. If this position control precision varies widely depending on whether the lens is in the extreme wide-angle state or the extreme telephoto state, then this will create problems such as delayed third lens group control speed, inability to attain a prescribed level of optical performance, and so forth.

Because the amount of travel required for focusing varies as a function of lateral magnification, exceeding the upper limit of conditional expression (6) will cause the degree of lens position control precision necessary to achieve a prescribed level of optical performance to become far greater when in the extreme telephoto state than when in the extreme wide-angle state, resulting in the problems mentioned above. Conversely, below the lower limit thereof, the required degree of position control precision when in the extreme wide-angle state will become extremely high, resulting in the problems mentioned above.

In accordance with another aspect of the present invention, in order to prevent mishaps resulting from blurring of the image due to unsteadiness in grip or the like which is apt to occur during shooting with zoom lenses having a high zooming ratio, it is possible to make the optical system resistant to vibration as a result of incorporation of a vibration detection system that detects unsteadiness and a drive system in the lens system, and making all or part of one of the lens groups making up the lens system eccentric so as to create an eccentric lens group, and correcting for blurring of the image by detecting unsteadiness with the vibration detection system, and using the drive means to cause eccentricity in the eccentric lens group and cause the image to shift so as to correct for the detected vibration.

Furthermore, it goes without saying that the variable-focal-length lens system of the present invention may be applied not only to zoom lenses, but also to varifocal zoom lenses wherein focal length states do not exist continuously (i.e., wherein focal length varies in discrete steps rather than being continuously variable across a range of focal length states).

EMBODIMENTS

Below, we describe several embodiments of the present invention.

FIG. 1 shows the refracting power distribution in the several embodiments of the present invention, the lens system therein consisting of, in order from the object side thereof, a first lens group G1 having positive refracting power, a second lens group G2 having negative refracting power, a third lens group G3 having positive refracting power, a fourth lens group G4 having positive refracting power, and a fifth lens group G5 having negative refracting power, the several lens groups moving toward the object side in such fashion as to cause the distance between the first lens group G1 and the second lens group G2 to increase, the distance between the second lens group G2 and the third lens group G3 to decrease, the distance between the third lens group G3 and the fourth lens group G4 to increase, and the distance between the fourth lens group G4 and the fifth lens group G5 to decrease, when focal length state changes from the extreme wide-angle state to the extreme telephoto state. Moreover, the second lens group G2 and the fourth lens group G4 move in integral fashion.

Furthermore, the third lens group G3 moves toward the image side during short-distance focusing.

In the several embodiments, aspheric surfaces are expressed in terms of the following formula:

$$x = cy^2/\{1+(1-\kappa c^2 y^2)^{1/2}\} + C4y^4 + C6y^6 +$$

where y is height from the optical axis, x is sagitta, c is curvature, κ is the conic constant, and C4, C6, . . . are aspheric coefficients.

Note that in the following a radius of curvature of 0 indicates a plane surface.

First Embodiment

Figure 2:
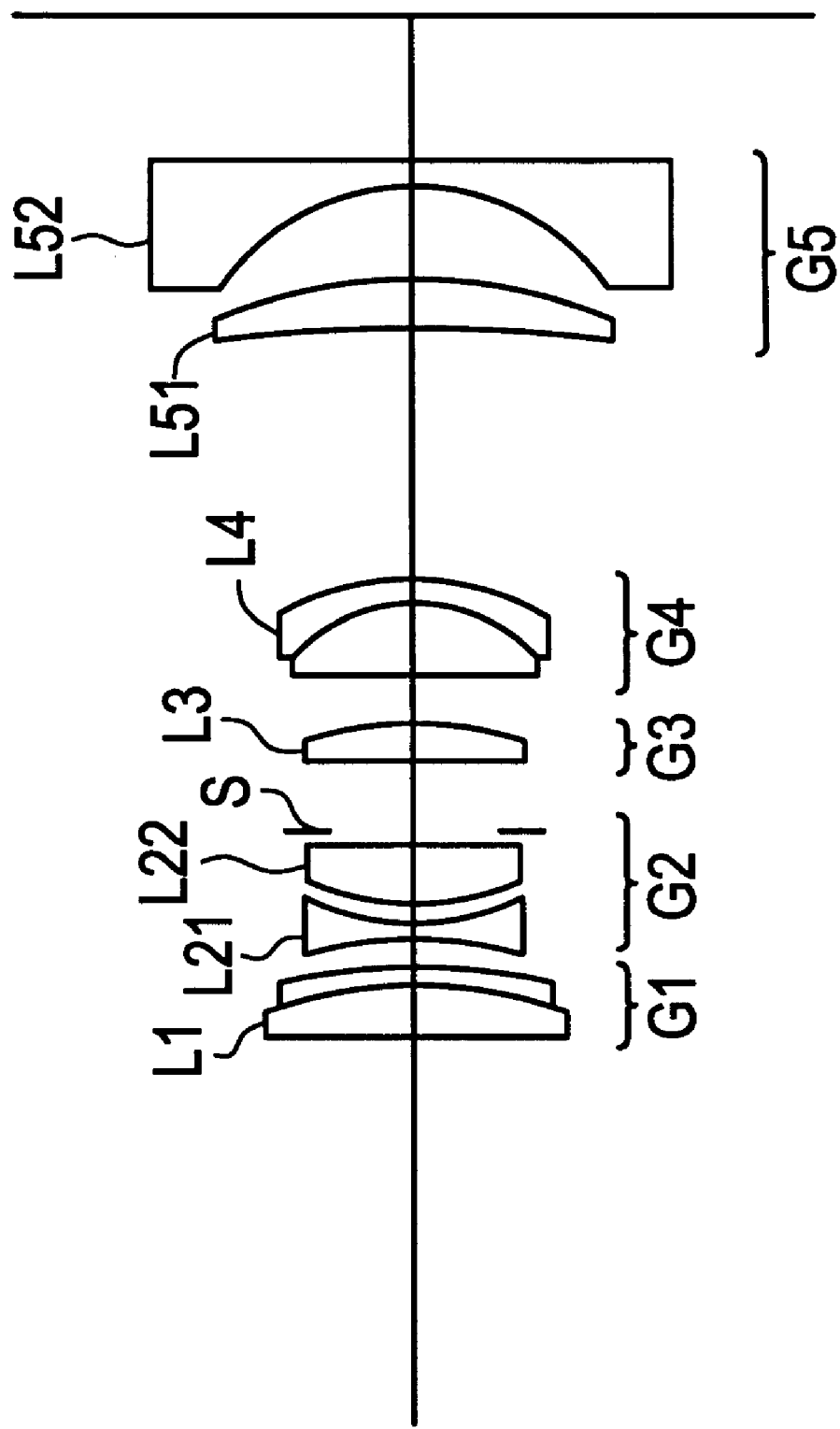
FIG. 2 is a cross-sectional diagram showing the constitution of a zoom lens in accordance with a first embodiment of the present invention.
Figure 3A:
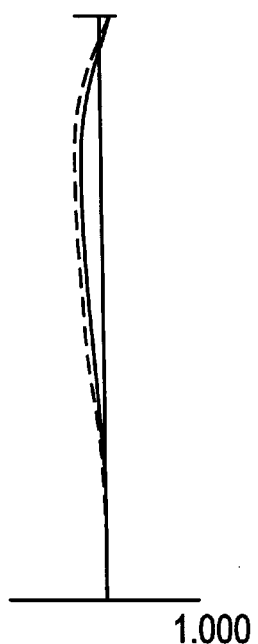
FIGS. 3A–3H (collectively referred to as "FIG. 3") contain aberration curves for the first embodiment when in the extreme wide-angle state (and focused on a subject at an infinite distance).
Figure 3B:
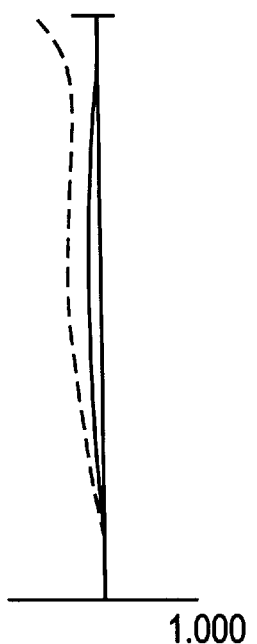
Figure 3C:
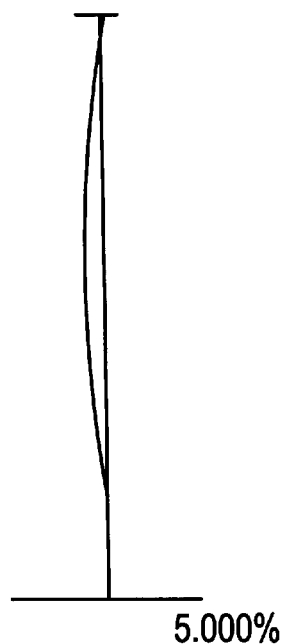
Figure 3D:
Figure 3E:
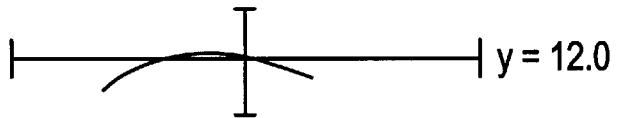
Figure 3F:
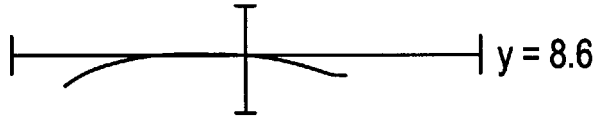
Figure 3G:
Figure 3H:
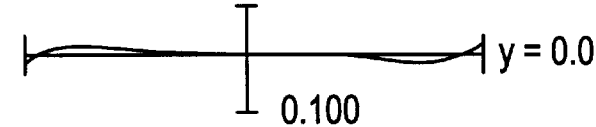

FIG. 2 is a drawing showing the constitution of the lenses in a first embodiment of the present invention, wherein, in order from the object side, a first lens group G1 consists of a cemented positive lens L1 containing a biconvex lens and a negative meniscus lens which presents a concave surface toward the object side, a second lens group G2 consists of a biconcave lens L21 and a biconvex lens L22, a third lens group G3 consists of a biconvex lens L3, a fourth lens group G4 consists of a cemented positive lens L4 containing a biconvex lens and a negative meniscus lens which presents a concave surface toward the object side, and, a fifth lens group G5 consists of a positive meniscus lens L51 which presents a concave surface toward the object side and a negative meniscus lens L52 which presents a concave surface toward the object side.

An aperture stop S is arranged between the second lens group G2 and the third lens group G3, and this aperture stop moves in integral fashion with the second lens group G2 as the positional state of the lens changes from the extreme wide-angle state to the extreme telephoto state.

Data values for the first embodiment of the present invention are presented at Tables 1 through 5, below. In the embodiment data tables, f indicates focal length, F NO indicates f-number, $2\omega$ indicates field angle, and Refractive Index indicates the value thereof at the d line ($\lambda$=587.6 nm).

TABLE 1

F 23.10 - 55.00 - 87.00
F NO 3.70 - 7.57 - 11.00
$2\omega$ 73.23 - 33.63 - 11.87°

| Surface No. | Radius of Curvature | Distance Between Surfaces | Refractive Index | Abbe Number |
|---|---|---|---|---|
| 1 | 64.2286 | 2.30 | 1.48749 | 70.45 |
| 2 | −17.9039 | 0.80 | 1.92286 | 20.88 |
| 3 | −26.0787 | (D3) | 1.0 | |
| 4 | −15.1749 | 0.80 | 1.83500 | 42.97 |
| 5 | 9.9388 | 0.80 | 1.0 | |
| 6 | 12.0612 | 2.50 | 1.84666 | 23.83 |
| 7 | −320.0405 | 0.60 | 1.0 | |
| 8 | 0.0000 | (D8) | 1.0 | (Aperture stop) |
| 9 | 55.5382 | 1.60 | 1.48749 | 70.45 |
| 10 | −17.0876 | (D10) | 1.0 | |
| 11 | 52.4449 | 3.25 | 1.55115 | 49.52 |
| 12 | −7.1265 | 1.00 | 1.92286 | 20.88 |
| 13 | −11.7799 | (D13) | 1.0 | |
| 14 | −41.3804 | 2.15 | 1.84666 | 23.83 |
| 15 | −20.1567 | 4.00 | 1.0 | |
| 16 | −10.0607 | 1.10 | 1.83500 | 42.98 |
| 17 | 364.1431 | (Bf) | | |

Surface No. 14 is aspheric, the coefficients thereof being as indicated at Table 2, below.

TABLE 2

| $\kappa$ = −2.9641 | C4 = +2.7901 × 10$^{-5}$ | C6 = +2.3395 × 10$^{-7}$ |
|---|---|---|
| | C8 = −1.5226 × 10$^{-9}$ | C10 = +5.0976 × 10$^{-11}$ |

TABLE 3

Variable Distance Values

| f | 23.1000 | 55.0000 | 86.9990 |
|---|---|---|---|
| D3 | 1.3024 | 7.1006 | 10.3008 |
| D8 | 3.0280 | 2.2228 | 2.0000 |
| D10 | 1.9128 | 2.7180 | 2.9408 |
| D13 | 11.0351 | 3.8728 | 1.4127 |
| Bf | 6.29999 | 30.8095 | 53.2162 |

TABLE 4

Travel During Focusing

| f | 23.1000 | 55.0000 | 86.9990 |
|---|---|---|---|
| $\Delta 3$ | 0.7801 | 0.4754 | 0.3867 |

Note that this is the third lens group travel $\Delta 3$ in going from focus on a subject at an infinite distance to focus on a subject at a short distance (photographic magnification - 1/40 x), with movement toward the image being taken as positive.

TABLE 5

Values Corresponding to Conditional Expressions

| | | | |
|---|---|---|---|
| | f1 | = | 53.2692 |
| | f2 | = | −17.2339 |
| | f3 | = | 27.0000 |
| | f4 | = | 26.4787 |
| | f5 | = | −17.4944 |
| | $\beta 3w$ | = | −3.943 |
| | $\beta 3t$ | = | −3.117 |
| (1) | Dc/{Z · (ft · fw)$^{1/2}$} | = | 0.092 |
| (2) | Da/|f2| | = | 0.273 |
| (3) | f4/f1 | = | 0.497 |
| (4) | Db/|f5| | = | 2.022 |
| (5) | f3/(ft·fw)$^{1/2}$ | = | 0.602 |
| (6) | ($\beta 3t/\beta 3w$)/Z | = | 0.210 |

FIGS. 3 through 8 show aberration curves for the first embodiment of the present invention, FIGS. 3 through 5 showing aberration curves when focused on a subject at an infinite distance, and FIGS. 6 through 8 showing aberration curves when focused on a subject at a short distance; FIGS. 3 and 6, FIGS. 4 and 7, and FIGS. 5 and 8 respectively show aberration curves when in the extreme wide-angle state (f=23.1), when in an intermediate focal length state (f=55.0), and when in the extreme telephoto state (f=87.0).

In the aberration curves shown in FIGS. 3 through 8, at the spherical aberration curves, the solid line indicates spherical aberration, the dotted line indicates the sine condition, and y indicates image height; at the astigmatism curves, the solid line indicates the sagittal image plane, the broken line indicates the meridional image plane, and d indicates aberration at the d line. At the coma curves, coma is shown for image heights y=0, 4.3, 8.6, 12.04, and 17.2; A indicates field angle and H indicates object height.

From the aberration curves, it is clear that the present embodiment satisfactorily corrects for the various types of aberration and displays superior imaging performance.

Second Embodiment

Figure 9:
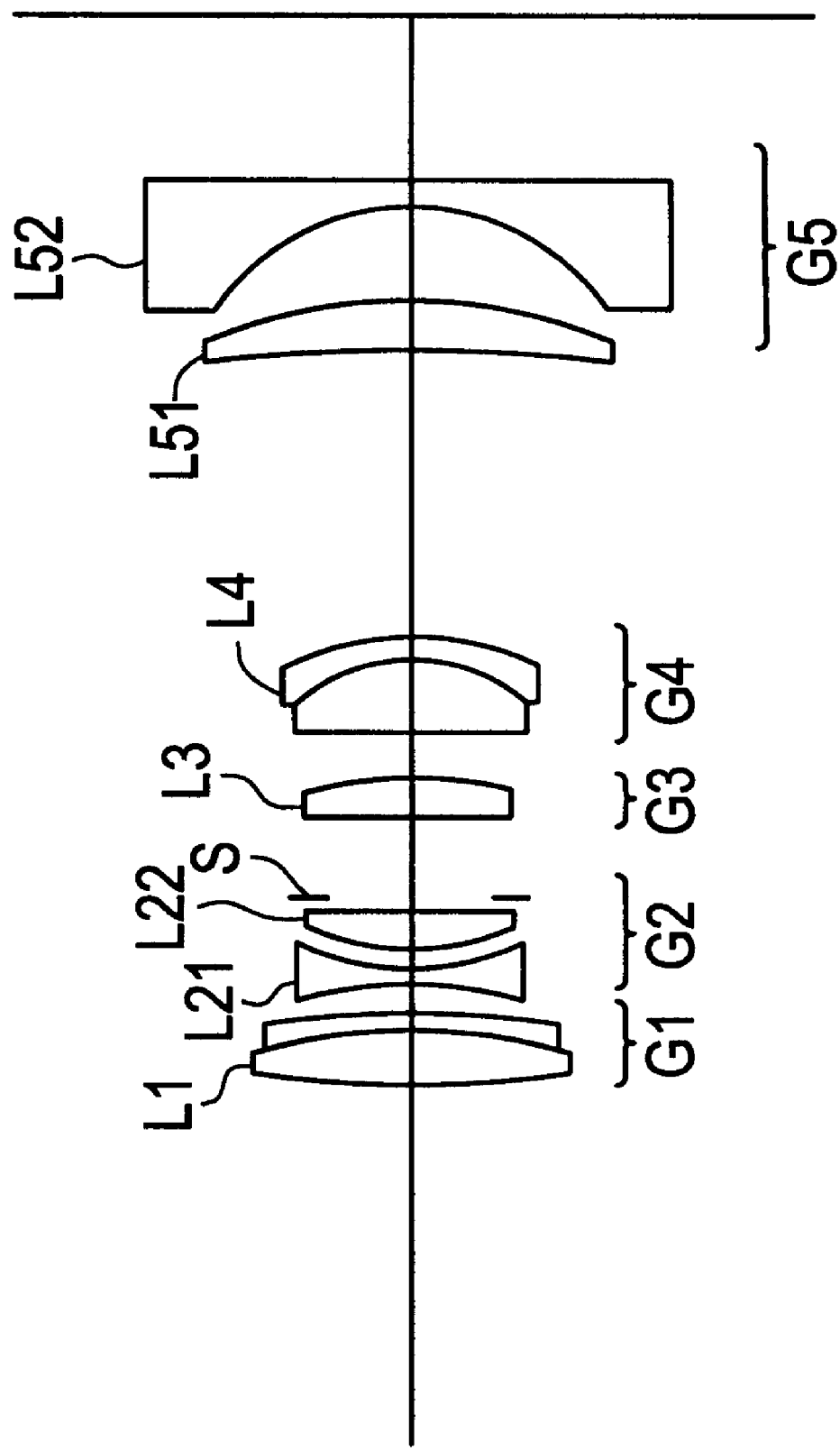
FIG. 9 (collectively referred to as "FIG. 9") is a cross-sectional diagram showing the constitution of a zoom lens in accordance with a second embodiment of the present invention.
Figure 10A:
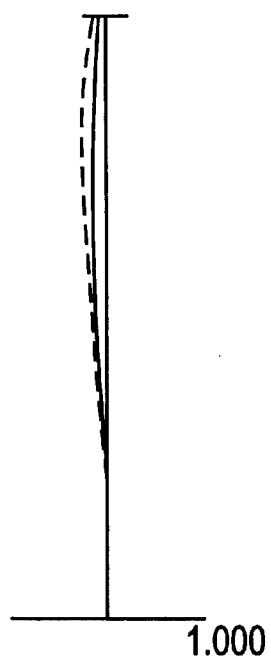
FIGS. 10A–10H (collectively referred to as "FIG. 10") contain aberration curves for the second embodiment when in the extreme wide-angle state (and focused on a subject at an infinite distance).
Figure 10B:
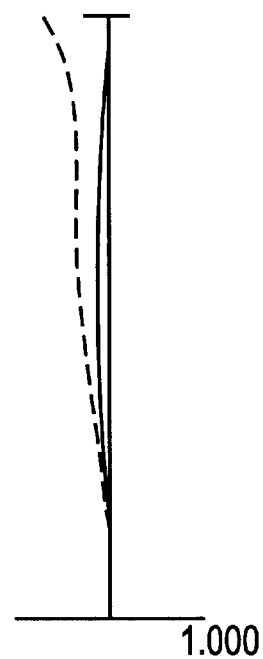
Figure 10C:
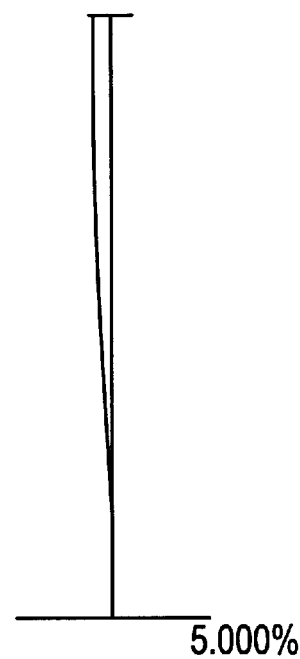
Figure 10D:
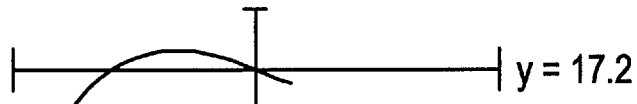
Figure 10E:
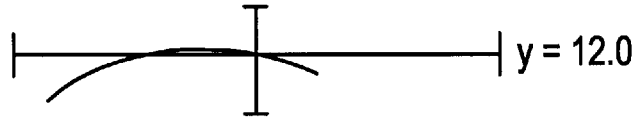
Figure 10F:
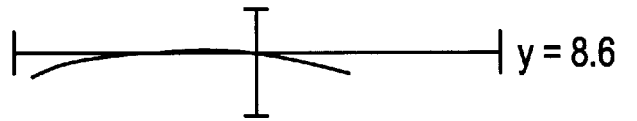
Figure 10G:
Figure 10H:
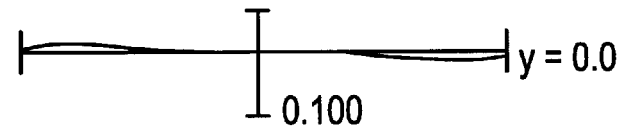
Figure 11A:
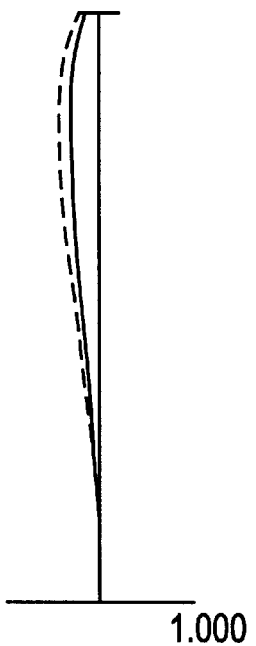
FIGS. 11A–11H (collectively referred to as "FIG. 11") contain aberration curves for the second embodiment when in an intermediate focal-length state (and focused on a subject at an infinite distance).
Figure 11B:
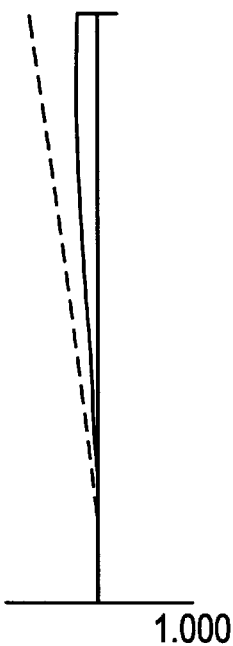
Figure 11C:
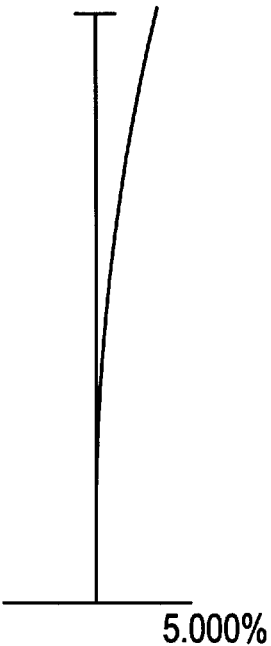
Figure 11D:
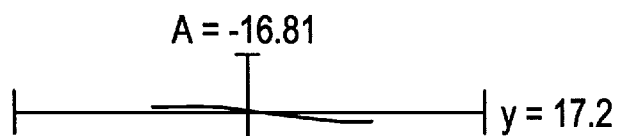
Figure 11E:
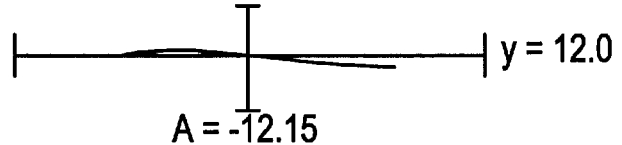
Figure 11F:
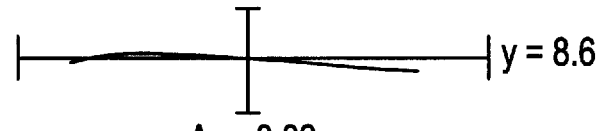
Figure 11G:
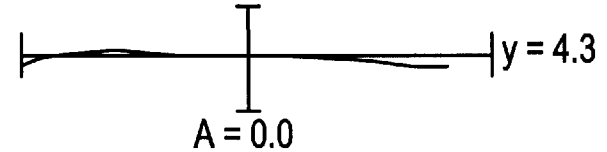
Figure 11H:
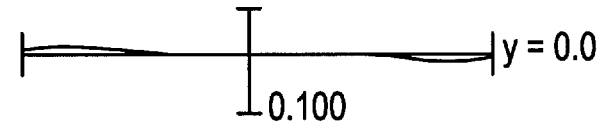
Figure 14A:
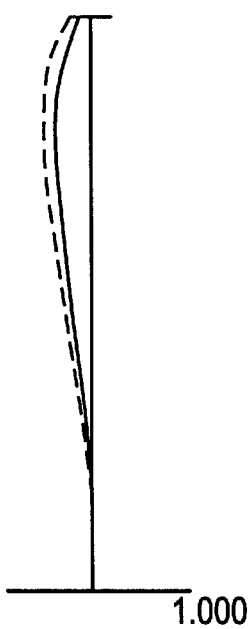
FIGS. 14A–14H (collectively referred to as "FIG. 14") contain aberration curves for the second embodiment when in an intermediate focal-length state (and focused on a subject at a short distance).
Figure 14B:
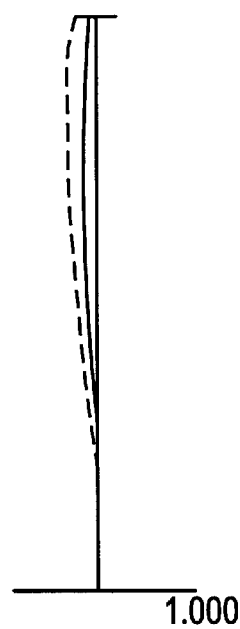
Figure 14C:
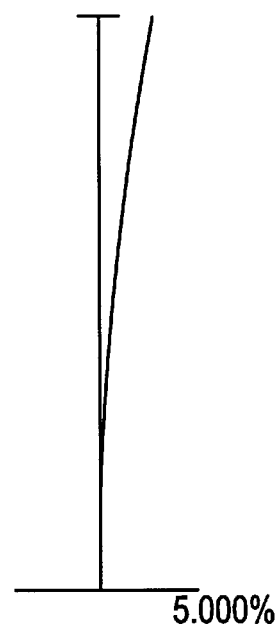
Figure 14D:
Figure 14E:
Figure 14F:
Figure 14G:
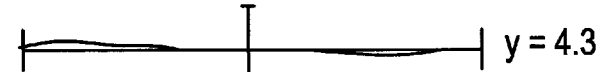
Figure 14H:
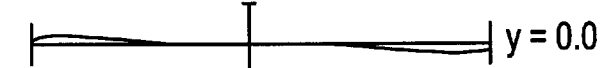
Figure 15A:
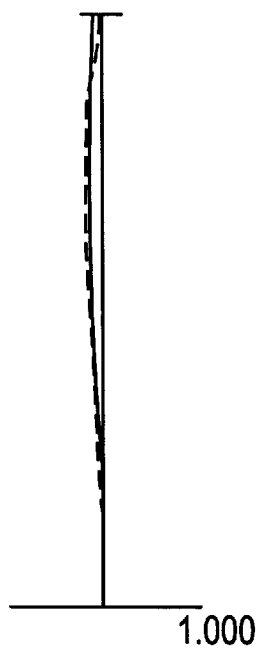
FIGS. 15A–15H (collectively referred to as "FIG. 15") contain aberration curves for the second embodiment when in the extreme telephoto state (and focused on a subject at a short distance).
Figure 15B:
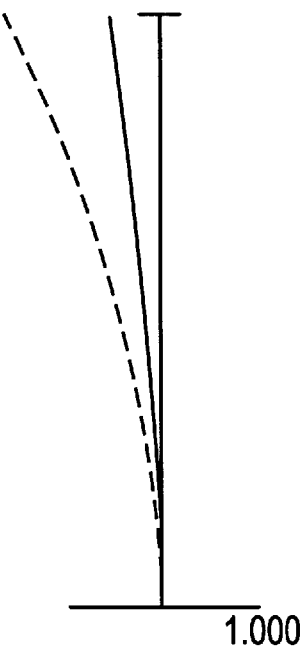
Figure 15C:
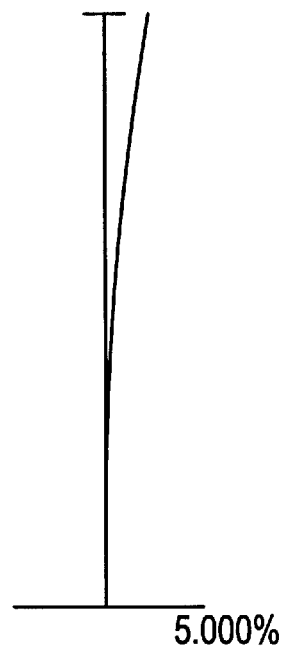
Figure 15D:
Figure 15E:
Figure 15F:
Figure 15G:
Figure 15H:
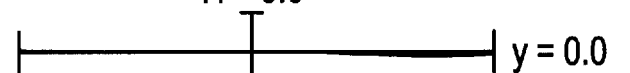
Figure 17A:
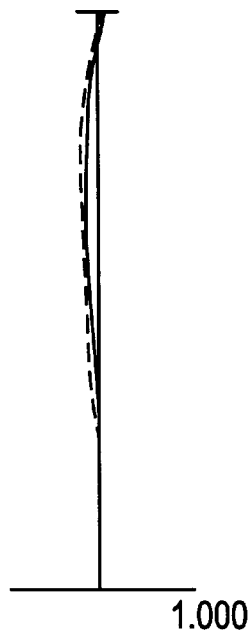
FIGS. 17A–17H (collectively referred to as "FIG. 17") contain aberration curves for the third embodiment when in the extreme wide-angle state (and focused on a subject at an infinite distance).
Figure 17B:
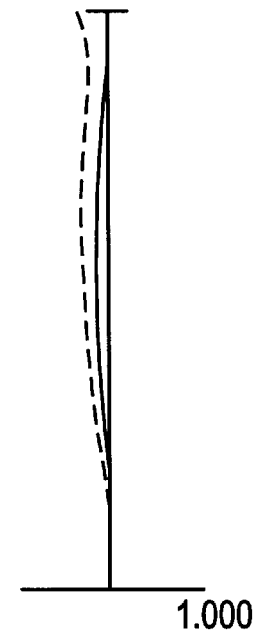
Figure 17C:
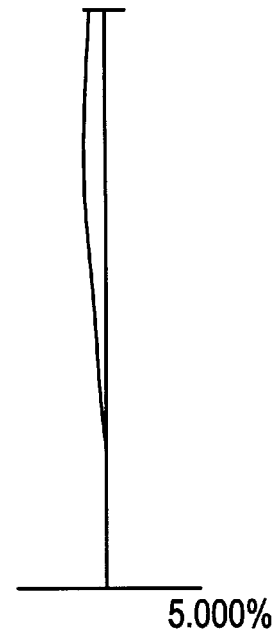
Figure 17D:
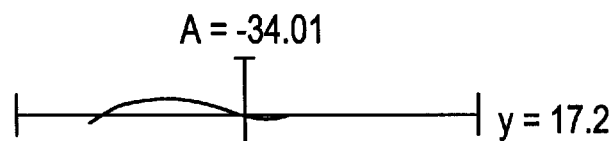
Figure 17E:
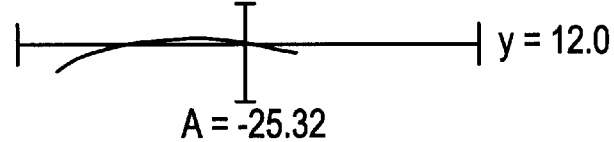
Figure 17F:
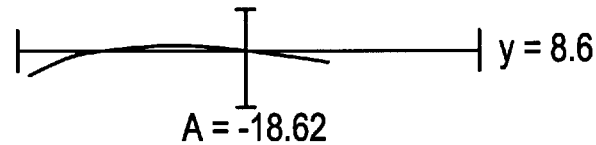
Figure 17G:
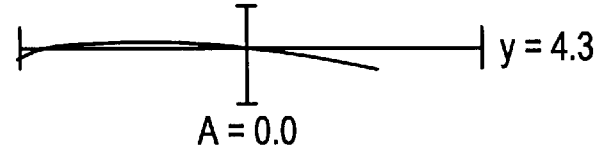
Figure 17H:
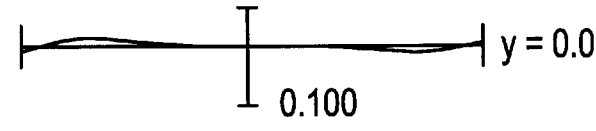
Figure 18A:
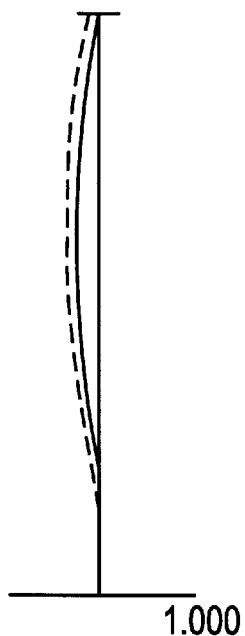
FIGS. 18A–18H (collectively referred to as "FIG. 18") contain aberration curves for the third embodiment when in an intermediate focal-length state (and focused on a subject at an infinite distance).
Figure 18B:
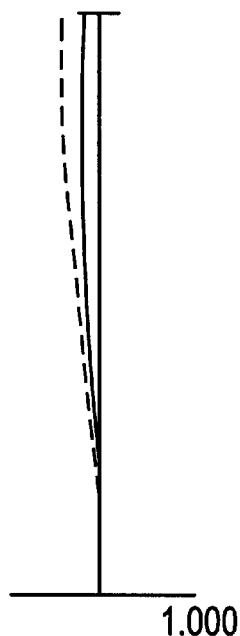
Figure 18C:
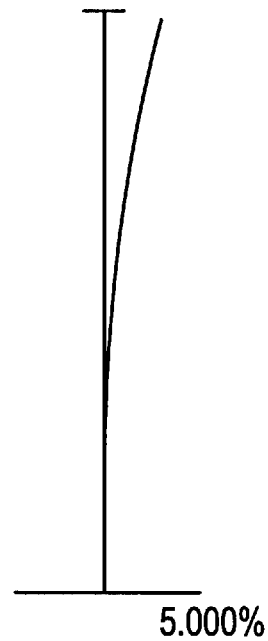
Figure 18D:
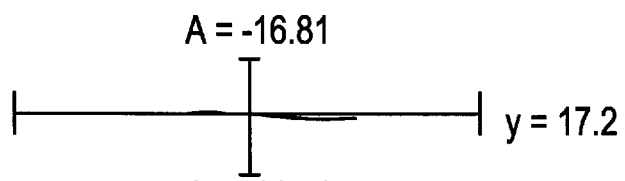
Figure 18E:
Figure 18F:
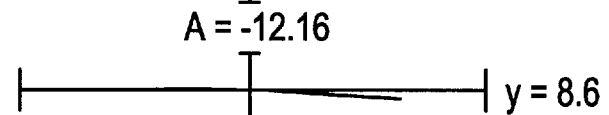
Figure 18G:
Figure 18H:
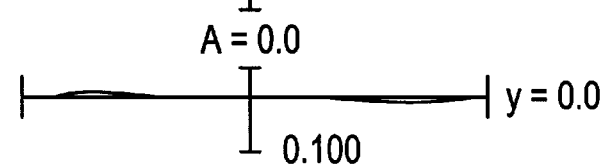
Figure 21A:
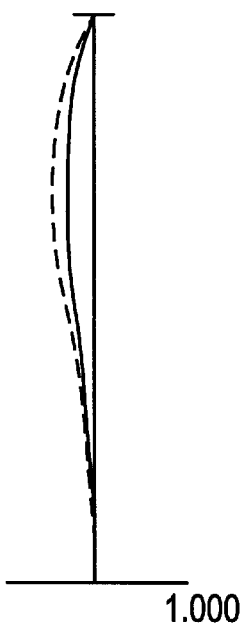
FIGS. 21A–21H (collectively referred to as "FIG. 21") contain aberration curves for the third embodiment when in an intermediate focal-length state (and focused on a subject at a short distance).
Figure 21B:
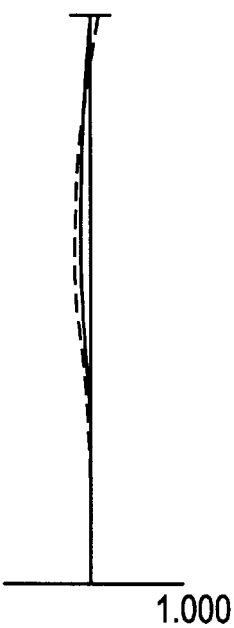
Figure 21C:
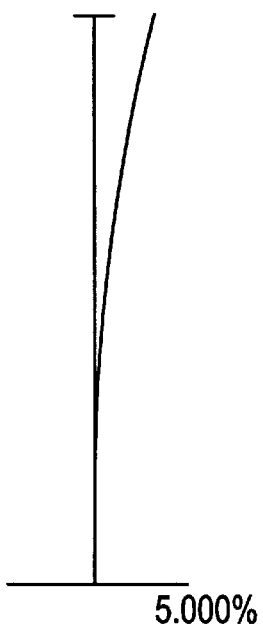
Figure 21D:
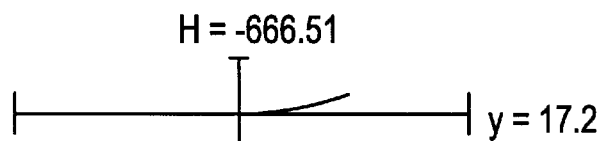
Figure 21E:
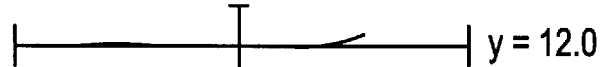
Figure 21F:
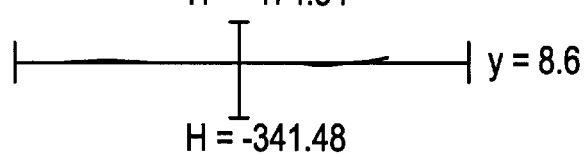
Figure 21G:
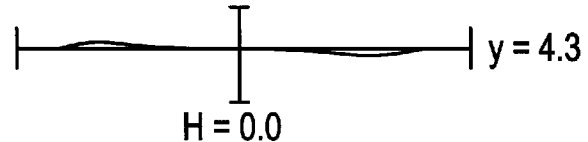
Figure 21H:
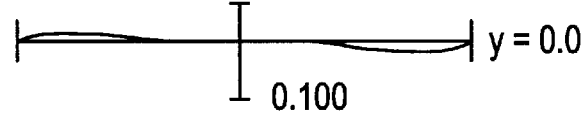
Figure 22A:
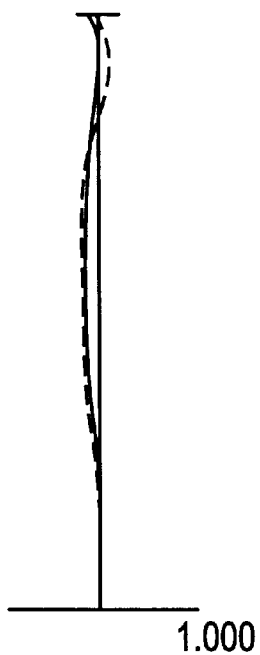
FIGS. 22A–22H (collectively referred to as "FIG. 22") contain aberration curves for the third embodiment when in the extreme telephoto state (and focused on a subject at a short distance).
Figure 22B:
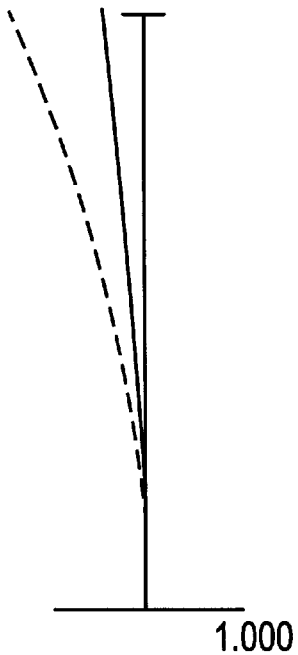
Figure 22C:
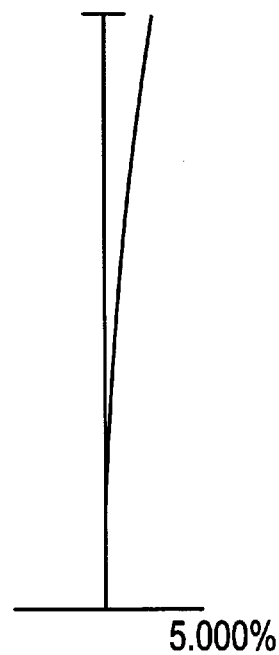
Figure 22D:
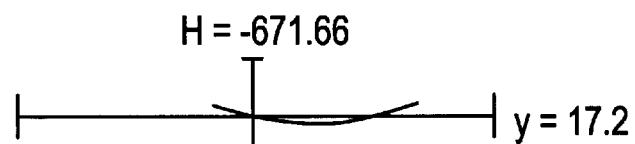
Figure 22E:
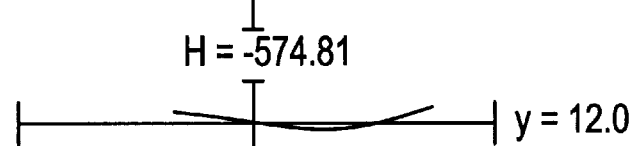
Figure 22F:
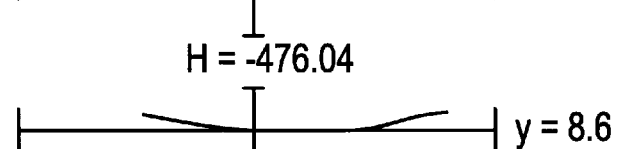
Figure 22G:
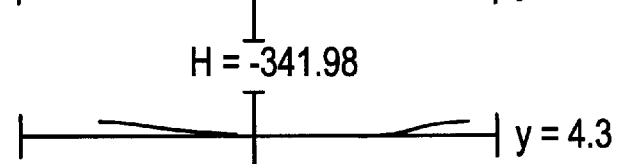
Figure 22H:
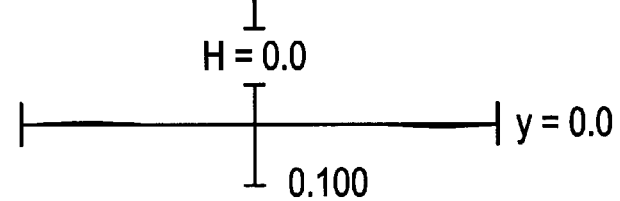

FIG. 9 is a drawing showing the constitution of the lenses in a second embodiment of the present invention, wherein, in order from the object side, a first lens group G1 consists of a cemented positive lens L1 containing a biconvex lens and a negative meniscus lens which presents a concave surface toward the object side, a second lens group G2 consists of a biconcave lens L21 and a positive lens L22 which presents a convex surface toward the object side, a third lens group G3 consists of a biconvex lens L3, a fourth lens group G4 consists of a cemented positive lens L4 containing a biconvex lens and a negative meniscus lens which presents a concave surface toward the object side, and a fifth lens group G5 consists of a positive meniscus lens L51 which presents a concave surface toward the object side and a negative meniscus lens L52 which presents a concave surface toward the object side.

An aperture stop S is arranged between the second lens group G2 and the third lens group G3, and this aperture stop moves in integral fashion with the second lens group G2 as the positional state of the lens changes from the extreme wide-angle state to the extreme telephoto state.

Data values for the second embodiment of the present invention are presented at Tables 6 through 10, below. In the embodiment data tables, f indicates focal length, F NO indicates f-number, 2ω indicates field angle, and Refractive Index indicates the value thereof at the d line ($\lambda$=587.6 nm).

TABLE 6

F 25.75 - 55.00 - 97.00
FNO 4.39 - 7.89 - 12.00
2ω 67.92 - 33.62 - 19.65°

| Surface No. | Radius of Curvature | Distance Between Surfaces | Refractive Index | Abbe Number | |
|---|---|---|---|---|---|
| 1 | 45.8743 | 2.30 | 1.48749 | 70.45 | |
| 2 | −20.9553 | 0.80 | 1.92286 | 20.88 | |
| 3 | −31.4943 | (D3) | 1.0 | | |
| 4 | −15.5974 | 0.80 | 1.83500 | 42.97 | |
| 5 | 10.8709 | 0.80 | 1.0 | | |
| 6 | 12.6655 | 1.55 | 1.84666 | 23.83 | |
| 7 | 461.2313 | 0.60 | 1.0 | | |
| 8 | 0.0000 | (D8) | 1.0 | | (Aperture stop) |
| 9 | 89.4192 | 1.60 | 1.56732 | 42.85 | |
| 10 | −18.5392 | (D10) | 1.0 | | |
| 11 | 43.2651 | 3.30 | 1.48749 | 70.45 | |
| 12 | −7.4615 | 1.00 | 1.92286 | 20.88 | |
| 13 | −11.5146 | (D13) | 1.0 | | |
| 14 | −53.8228 | 2.10 | 1.84666 | 23.83 | |
| 15 | −21.9850 | 4.00 | 1.0 | | |
| 16 | −10.6981 | 1.10 | 1.83500 | 42.98 | |
| 17 | 394.2978 | (Bf) | | | |

Surface No. 14 is aspheric, the coefficients thereof being as indicated at Table 7, below.

TABLE 7

$\kappa$ = 1.0000    C4 = +3.1909 × $10^{-5}$    C6 = +1.1752 × $10^{-7}$
             C8 = +1.7169 × $10^{-10}$   C10 = +2.6413 × $10^{-11}$

TABLE 8

Variable Distance Values

| f | 25.7501 | 55.0000 | 97.0004 |
|---|---|---|---|
| D3 | 1.2000 | 7.6550 | 12.6176 |
| D8 | 3.4250 | 2.6088 | 2.0000 |
| D10 | 1.9071 | 2.7232 | 3.3321 |
| D13 | 12.2854 | 4.9241 | 1.2000 |
| Bf | 7.3000 | 28.7169 | 54.9005 |

Table 9 Travel During Focusing

Note that this is the third lens group travel Δ3 in going from focus on a subject at an infinite distance to focus on a subject at a short distance (photographic magnification −1/40 x), with movement toward the image being taken as positive.

| f | 25.7501 | 55.0000 | 97.0004 |
|---|---|---|---|
| Δ3 | 0.6934 | 0.5037 | 0.4409 |

TABLE 10

Values Corresponding to Conditional Expressions

| | f1 | = | 52.2672 |
|---|---|---|---|
| | f2 | = | −17.0001 |
| | f3 | = | 27.2128 |
| | f4 | = | 29.0505 |
| | f5 | = | −19.7356 |
| | β3t | = | −3.053 |
| | β3w | = | −4.454 |
| (1) | Dc/{Z · (ft · fw)$^{1/2}$} | = | 0.080 |
| (2) | Da/|f2| | = | 0.221 |
| (3) | f4/f1 | = | 0.556 |
| (4) | Db/|f5| | = | 1.556 |
| (5) | f3/(ft·fw)$^{1/2}$ | = | 0.545 |
| (6) | (β3t/β3w)/Z | = | 0.182 |

FIGS. 10 through 15 show aberration curves for the second embodiment of the present invention, FIGS. 10 through 12 showing aberration curves when focused on a subject at an infinite distance, and FIGS. 13 through 15 showing aberration curves when focused on a subject at a short distance; FIGS. 10 and 13, FIGS. 11 and 14, and FIGS. 12 and 15 respectively show aberration curves when in the extreme wide-angle state (f=25.75), when in an intermediate focal length state (f=55.0), and when in the extreme telephoto state (f=97.0).

In the aberration curves shown in FIGS. 10 through 15, at the spherical aberration curves, the solid line indicates spherical aberration, the dotted line indicates the sine condition, and y indicates image height; at the astigmatism curves, the solid line indicates the sagittal image plane, the broken line indicates the meridional image plane, and d indicates aberration at the d line. At the coma curves, coma is shown for image heights y=0, 4.3, 8.6, 12.04, and 17.2; A indicates field angle and H indicates object height.

From the aberration curves, it is clear that the present embodiment satisfactorily corrects for the various types of aberration and displays superior imaging performance.

Third Embodiment

FIG. 16 is a drawing showing the constitution of the lenses in a third embodiment of the present invention, wherein, in order from the object side, a first lens group G1 consists of a cemented positive lens L1 containing a biconvex lens and a negative meniscus lens which presents a concave surface toward the object side, a second lens group G2 consists of a biconcave lens L21 and a positive lens L22 which presents a convex surface toward the object side, a third lens group G3 consists of a biconvex lens L3, a fourth lens group G4 consists of a cemented positive lens L4 containing a biconvex lens and a negative meniscus lens which presents a concave surface toward the object side, and a fifth lens group G5 consists of a positive meniscus lens L51 which presents a concave surface toward the object side and a negative meniscus lens L52 which presents a concave surface toward the object side.

An aperture stop S is arranged between the second lens group G2 and the third lens group G3, and this aperture stop moves in integral fashion with the second lens group G2 as the positional state of the lens changes from the extreme wide-angle state to the extreme telephoto state.

Data values for the third embodiment of the present invention are presented at Tables 11 through 15, below. In the embodiment data tables, f indicates focal length, F NO indicates f-number, 2ω indicates field angle, and Refractive Index indicates the value thereof at the d line (λ=587.6 nm).

TABLE 11

F 25.70 - 55.00 - 97.00
F NO 4.08 - 7.33 - 11.00
2ω 68.01 - 33.63 - 19.63°

| Surface No. | Radius of Curvature | Distance Between Surfaces | Refractive Index | Abbe Number |
|---|---|---|---|---|
| 1 | 42.3160 | 2.00 | 1.48749 | 70.45 |
| 2 | −23.9119 | 0.80 | 1.92286 | 20.88 |
| 3 | −35.9323 | (D3) | 1.0 | |
| 4 | −16.1423 | 0.80 | 1.83500 | 42.97 |
| 5 | 10.5383 | 0.80 | 1.0 | |
| 6 | 12.2717 | 1.65 | 1.84666 | 23.83 |
| 7 | 365.1550 | 0.60 | 1.0 | |
| 8 | 0.0000 | (D8) | 1.0 | |
| 9 | 74.0990 | 1.60 | 1.48749 | 70.45 |
| 10 | −17.6593 | (D10) | 1.0 | |
| 11 | 46.9068 | 3.10 | 1.51742 | 52.16 |
| 12 | −7.5322 | 1.00 | 1.92286 | 20.88 |
| 13 | −12.0397 | (D13) | 1.0 | |
| 14 | −61.5315 | 2.10 | 1.84666 | 23.83 |
| 15 | −23.4849 | 4.20 | 1.0 | |
| 16 | −11.4121 | 1.10 | 1.83500 | 42.98 |
| 17 | 179.5252 | (Bf) | | |

Surface No. 14 is aspheric, the coefficients thereof being as indicated at Table 12, below.

TABLE 12

| κ = 10.0584 | C4 = +3.1313 × 10$^{-5}$ | C6 = +4.5322 × 10$^{-8}$ |
|---|---|---|
| | C8 = +8.2487 × 10$^{-10}$ | C10 = +1.0721 × 10$^{-11}$ |

TABLE 13

Variable Distance Values

| f | 25.6995 | 54.9984 | 96.9958 |
|---|---|---|---|
| D3 | 1.2048 | 7.6162 | 13.1849 |
| D8 | 3.5816 | 2.5630 | 2.0000 |
| D10 | 1.9334 | 2.9520 | 3.5151 |
| D13 | 12.9689 | 5.2899 | 1.2000 |
| Bf | 7.0116 | 28.4777 | 54.3376 |

Table 14 Travel During Focusing

Note that this is the third lens group travel Δ3 in going from focus on a subject at an infinite distance to focus on a subject at a short distance (photographic magnification −1/40 x), with movement toward the image being taken as positive.

| f | 25.6995 | 54.9984 | 96.9958 |
|---|---|---|---|
| Δ3 | 0.7138 | 0.5103 | 0.4682 |

TABLE 15

Values Corresponding to Conditional Expressions

| | f1 | = | 52.7735 |
|---|---|---|---|
| | f2 | = | −17.3599 |
| | f3 | = | 29.4215 |

TABLE 15-continued

Values Corresponding to Conditional Expressions

| | f4 | = | 28.5728 |
|---|---|---|---|
| | f5 | = | −20.4771 |
| | β3t | = | −3.695 |
| | β3w | = | −6.066 |
| (1) | Dc/{Z · (ft · fw)$^{1/2}$} | = | 0.080 |
| (2) | Da/|f2| | = | 0.222 |
| (3) | f4/f1 | = | 0.541 |
| (4) | Db/|f5| | = | 0.909 |
| (5) | f3/(ft·fw)$^{1/2}$ | = | 0.589 |
| (6) | (β3t/β3w)/Z | = | 0.161 |

FIGS. 17 through 22 show aberration curves for the third embodiment of the present invention, FIGS. 17 through 19 showing aberration curves when focused on a subject at an infinite distance, and FIGS. 20 through 22 showing aberration curves when focused on a subject at a short distance; FIGS. 17 and 20, FIGS. 18 and 21, and FIGS. 19 and 22 respectively show aberration curves when in the extreme wide-angle state (f=25.70), when in an intermediate focal length state (f=55.0), and when in the extreme telephoto state (f=97.0).

In the aberration curves shown in FIGS. 17 through 22, at the spherical aberration curves, the solid line indicates spherical aberration, the dotted line indicates the sine condition, and y indicates image height; at the astigmatism curves, the solid line indicates the sagittal image plane, the broken line indicates the meridional image plane, and d indicates aberration at the d line. At the coma curves, coma is shown for image heights y=0, 4.3, 8.6, 12.04, and 17.2; A indicates field angle and H indicates object height.

From the aberration curves, it is clear that the present embodiment satisfactorily corrects for the various types of aberration and displays superior imaging performance.

As described above, the variable-focal-length lens systems associated with the several embodiments permit achievement of small size and high zooming ratio. Furthermore, whereas shortening of overall lens length when in the extreme telephoto state and reduction in lens diameter have been simultaneously achieved through the appropriate use of aspheric surfaces, it goes without saying that higher zooming ratio or larger relative aperture, or further reduction in the size of the lens system, may be achieved through the further use of aspheric surfaces.

What is claimed is:

1. A variable-focal-length lens system characterized in that it possesses, in order from the object side thereof, a first lens group having positive refracting power, a second lens group having negative refracting power, a third lens group having positive refracting power, a fourth lens group having positive refracting power, and a fifth lens group having negative refracting power, an aperture stop being arranged between the aforesaid second lens group and the aforesaid third lens group, in that all of the lens groups move toward the object side in such fashion as to cause the distance between the aforesaid first lens group and the aforesaid second lens group to increase, the distance between the aforesaid second lens group and the aforesaid third lens group to decrease, the distance between the aforesaid third lens group and the aforesaid fourth lens group to increase, and the distance between the aforesaid fourth lens group and the aforesaid fifth lens group to decrease, when the positional state of the lens changes from the extreme wide-angle state to the extreme telephoto state, and the aforesaid second lens group and the aforesaid fourth lens group move in integral fashion during a change in the positional state of the lens, in that the aforesaid third lens group moves during short-distance focusing, in that the following conditional expression (1) is satisfied:

$$0.05<Dc/\{Z\cdot(ft\cdot fw)^{1/2}\}<0.1, \quad (1)$$

where:

Dc=Length along the optical axis from the lens surface at the object-most side of the second lens group to the lens surface at the image-most side of the fourth lens group, fw=Focal length when in the extreme wide-angle state, ft=Focal length when in the extreme telephoto state, and Z=Zooming ratio (=ft/fw), and in that at least one of the following conditional expressions (2) and (3) is satisfied:

$$0.4<Da/|f2|<0.8, \quad (2)$$

and $$0.4<f4/f1<0.7, \quad (3)$$

where:

Da=Distance along the optical axis from the lens surface at the object-most side of the second lens group to the aperture stop when in the extreme wide-angle state, f2=Focal length of the second lens group (f2<0), f1=Focal length of the first lens group (f1>0), and f4=Focal length of the fourth lens group (f4>0).

2. In a variable-focal-length lens system according to claim 1 a variable-focal-length lens system characterized in that the following conditional expression (4) is satisfied:

$$0.8<Db/|f5|<2.4, \quad (4)$$

where:

Db=Distance from the aperture stop to the image plane when in the extreme wide-angle state, and f5=Focal length of the fifth lens group (f5<0).

3. In a variable-focal-length lens system according to claim 2 a variable-focal-length lens system characterized in that at least one of the following conditional expressions (5) and (6) is satisfied:

$$0.2<f3/(ft\cdot fw)^{1/2}<0.4, \quad (5)$$

and $$0.12<(\beta 3t/\beta 3w)/Z<0.3, \quad (6)$$

where:

f3=Focal length of the third lens group,

β3t=Lateral magnification of the third lens group when in the extreme telephoto state, and β3w=Lateral magnification of the third lens group when in the extreme wide-angle state.

4. In a variable-focal-length lens system according to claim 1, a variable-focal-length lens system characterized in that at least one of the following conditional expressions (5) and (6) is satisfied:

$$0.2<f3/(ft\cdot fw)^{1/2}<0.4, \quad (5)$$

and $$0.12<(\beta 3t/\beta 3w)/Z<0.3, \quad (6)$$

where:

f3=Focal length of the third lens group (f3>0),

β3t=Lateral magnification of the third lens group when in the extreme telephoto state, and β3w=Lateral magnification of the third lens group when in the extreme wide-angle state.

5. A variable-focal-length lens system characterized in that it possesses, in order from the object side thereof, a first lens group having positive refracting power, a second lens group having negative refracting power, a third lens group having positive refracting power, a fourth lens group having positive refracting power, and a fifth lens group having negative refracting power, an aperture stop being arranged between the aforesaid second lens group and the aforesaid third lens group, in that all of the lens groups move toward the object side in such fashion as to cause the distance between the aforesaid first lens group and the aforesaid second lens group to increase, the distance between the aforesaid second lens group and the aforesaid third lens group to decrease, the distance between the aforesaid third lens group and the aforesaid fourth lens group to increase, and the distance between the aforesaid fourth lens group and the aforesaid fifth lens group to decrease, when the positional state of the lens changes from the extreme wide-angle state to the extreme telephoto state, and the aforesaid second lens group and the aforesaid fourth lens group move in integral fashion during a change in the positional state of the lens, in that the aforesaid third lens group moves during short-distance focusing, in that the following conditional expression (1) is satisfied:

$$0.05<Dc/\{Z\cdot(ft\cdot fw)^{1/2}\}<0.1, \quad (1)$$

where:

Dc=Length along the optical axis from the lens surface at the object-most side of the second lens group to the lens surface at the image-most side of the fourth lens group, fw=Focal length when in the extreme wide-angle state, ft=Focal length when in the extreme telephoto state, and Z=Zooming ratio (=ft/fw), and in that the following conditional expression (4) is satisfied:

$$0.8<Db/|f5|<2.4, \quad (4)$$

where:

Db=Distance from the aperture stop to the image plane when in the extreme wide-angle state, and f5=Focal length of the fifth lens group (f5<0).

6. In a variable-focal-length lens system according to claim 5, a variable-focal-length lens system characterized in that at least one of the following conditional expressions (5) and (6) is satisfied:

$$0.2 < f3/(ft \cdot fw)^{1/2} < 0.4, \quad (5)$$

and $$0.12 < (\beta 3t/\beta 3w)/Z < 0.3, \quad (6)$$

where:
- f3=Focal length of the third lens group (f3>0),
- $\beta 3t$=Lateral magnification of the third lens group when in the extreme telephoto state, and
- $\beta 3w$=Lateral magnification of the third lens group when in the extreme wide-angle state.

* * * * *